(12) United States Patent
Kakita et al.

(10) Patent No.: US 9,707,910 B2
(45) Date of Patent: Jul. 18, 2017

(54) STEERING APPARATUS

(71) Applicant: NSK Ltd., Shinagawa-ku, Tokyo (JP)

(72) Inventors: Hiroshi Kakita, Gunma (JP); Daiki Orihara, Gunma (JP); Osamu Kurihara, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/121,771

(22) PCT Filed: May 28, 2015

(86) PCT No.: PCT/JP2015/065369
§ 371 (c)(1),
(2) Date: Aug. 25, 2016

(87) PCT Pub. No.: WO2015/190300
PCT Pub. Date: Dec. 17, 2015

(65) Prior Publication Data
US 2017/0072877 A1    Mar. 16, 2017

(30) Foreign Application Priority Data

Jun. 13, 2014 (JP) .................................. 2014-122604
May 8, 2015 (JP) .................................. 2015-095791
May 8, 2015 (JP) .................................. 2015-095792

(51) Int. Cl.
| B60R 16/027 | (2006.01) |
| B62D 1/185 | (2006.01) |
| B62D 1/187 | (2006.01) |
| B62D 1/19 | (2006.01) |

(52) U.S. Cl.
CPC ............ B60R 16/027 (2013.01); B62D 1/185 (2013.01); B62D 1/187 (2013.01); B62D 1/192 (2013.01)

(58) Field of Classification Search
CPC ...... B60R 16/027; B62D 1/195; B62D 1/192; B62D 1/187; B62D 1/185
See application file for complete search history.

(56) References Cited

FOREIGN PATENT DOCUMENTS

| JP | 60-3677 U | 1/1985 |
| JP | 2005-75250 A | 3/2005 |
| JP | 2005-280498 A | 10/2005 |
| JP | 2009-6962 A | 1/2009 |
| JP | 2009-107506 A | 5/2009 |
| WO | WO 04/000627 A1 | 12/2003 |

OTHER PUBLICATIONS

International Preliminary Report on Patentability for International Patent Application No. PCT/JP2015/065369, May 24, 2016.
International Search Report for International Patent Application No. PCT/JP2015/065369, Jul. 28, 2015.

*Primary Examiner* — Karen Beck
(74) *Attorney, Agent, or Firm* — Shapiro, Gabor and Rosenberger, PLLC

(57) ABSTRACT

A steering apparatus is disclosed, which includes a steering shaft (3), an outer column (10), an inner column (11) fitted in the outer column, a guide member (31) received in a guide groove (25) formed in the outer column and fitted to the inner column (11), and an electrifying member (40) fitted to the inner column inwardly of the guide groove and getting in contact with the outer column (10).

15 Claims, 25 Drawing Sheets

STEERING APPARATUS

TECHNICAL FIELD

The present invention pertains to a steering apparatus mounted in an automobile and other equivalent vehicles, and particularly to a technology of ensuring electrifying paths for electrical equipments fitted to a steering wheel.

BACKGROUND ART

In recent years, the automobiles have widely adopted a steering apparatus configured so that a steering column constructed to include two components, i.e., an inner column and an outer column, becomes collapsible to absorb a secondary collision energy in order to relieve an impact exerted on a driver upon the secondary collision with the steering wheel in case of an accident. In this type of steering apparatus, the inner column and the outer column relatively slide on each other in an axial direction, whereby the steering wheel moves toward the front of a vehicle, and an energy absorbing means provided between the inner column and the outer column absorbs the secondary collision energy.

For example, in the steering apparatus described in Patent document 1, the outer column disposed on a lower side is secured to a car body through a tilt bracket and a tilt pivot, and a tilt/telescopic adjustment mechanism clamps the outer column to thereby hold the inner column disposed on an upper side. In this steering apparatus, an ingression-enabled quantity of the inner column into the outer column is set larger than when making a telescopic adjustment, and the inner column moves to the front side of the vehicle while resisting a clamping friction force of the tilt/telescopic adjustment mechanism upon the secondary collision.

What is required of this steering apparatus is to smoothly absorb the secondary collision energy generated when a driver having a light weight collides with the steering wheel. To fulfill this requirement, it is considered to reduce a clamping force of the tilt/telescopic adjustment mechanism; however, with the clamping force being decreased, the force of holding the inner column decreases, resulting in a backlash that is easy to occur at a fitting portion between the inner column and the outer column. Such being the case, according to Patent document 1, a low friction material treatment such as coating is applied over an outer peripheral surface of the inner column or an inner peripheral surface of the outer column, thereby reducing the holding friction force without decreasing the holding force.

In a telescopic type steering apparatus, the steering shaft is generally configured to include an inner shaft and an outer shaft, which are spline-joined within the steering column in order to render a transfer of a steering torque and a telescopic adjustment compatible with each other. In this case, resin coating is often applied to one of two splines, i.e., a male spline and a female spline, for preventing emission of backlash noises due to a minute gap between the male spline and the female spline.

DOCUMENT OF PRIOR ART

Patent Document

Patent document 1: International Publication WO2004/000627

SUMMARY OF THE INVENTION

Problem to be Solved by the Invention

The steering wheel of an automobile is equipped with electrical components such as a horn and an airbag, and a majority of these electrical components is of a body earth type, so that an electrifying path leading to the car body from the steering wheel needs to be ensured.

However, as described above, when the low friction material coating is applied over the inner peripheral surface of the outer column or the outer peripheral surface of the inner column, the coating makes difficult electrification through the electrifying path via a contact surface between the inner column and the outer column. Further, the resin coating is applied to a spline-fitted portion of the steering shaft, in which case the resin coating makes difficult the electrification through the electrifying path via the spline-fitted portion.

It is an object of the present invention to provide a steering apparatus configured to ensure a new electrifying path leading to a car body from a steering wheel.

Means for Solving the Problems

For solving the problems described above, the present invention provides a steering apparatus including: a steering shaft having a conductive property and transferring a steering force; an outer column having the conductive property, the outer column including a guide groove penetrating in a radial direction and extending in an axial direction, and the outer column supporting the steering shaft rotatably; an inner column having the conductive property, the inner column being fitted in the outer column to enable a relative movement in the axial direction, and the inner column supporting the steering shaft rotatably; a guide member received in the guide groove, the guide member being fitted to the inner column; and an electrifying member fitted to the inner column inwardly of the guide groove, the electrifying member being in contact with the outer column. This configuration enables a new electrifying path to be ensured, which extends from the steering wheel to a car body.

Preferably, the steering apparatus further includes a fixture having the conductive property, the fixture fixing the guide member and the electrifying member to the inner column while being in contact with the inner column. This configuration enables easy fitting of the guide member and the electrifying member.

Preferably, the electrifying member is made of a metal plate material and is in contact with the outer column at a predetermined contact pressure while getting elastically deformed. With this configuration, the electrifying member is always in contact with the outer column, whereby the electrifying path can be stably ensured.

Preferably, the electrifying member is in contact with upper surfaces of guide walls formed on both sides of the guide groove. This configuration enables the electrifying member to easily get in contact with the outer column.

Preferably, the electrifying member has a couple of contact pieces extending on both of left and right sides. With this configuration, the electrifying member is in contact with the outer column further stably.

Preferably, the electrifying member has a plurality of contact pieces being in contact with the upper surfaces of the guide wall, the plurality of contact pieces being arranged in front-and-rear direction of a vehicle. With this configuration, the electrifying member is surely in contact with the guide walls, thereby enabling reliability on the electrifying path to be enhanced.

Preferably, the contact pieces are disposed on both of left and right sides of the electrifying member. With this configuration, the electrifying member is further surely in contact with the guide walls, thereby enabling the enhancement of the reliability on the electrifying path.

Preferably, the contact pieces are formed with contact protrusions protruding on the side of the outer column. With this configuration, a friction force generated upon a movement of the electrifying member in the axial direction can be decreased by reducing a contact area between the electrifying member and the outer column.

Preferably, the contact protrusion protrudes in a semi-spherical shape. This configuration prevents hooking thereof onto the surface of the outer column 10, and thus enables smooth sliding.

Preferably, the contact protrusion is elongate in the front-and-rear direction. With this configuration, it is feasible to prevent a failure of the contact between the outer column and the electrifying member due to a backlash caused between the outer column and the inner column.

Preferably, a flexural portion is formed at a portion, on a proximal side, of the contact piece. This configuration makes the contact piece easy to elastically deform following the backlash between the outer column and the inner column.

Preferably, a hole is formed at a center of the portion, on a proximal side, of the contact piece. This configuration facilitates the elastic deformation of the contact piece, and the contact piece can be prevented from being fractured owing to an inclination of the inner column with respect to the outer column.

Preferably, a surface, being in contact with the electrifying member, of the outer column is smoothly finished by grinding. This configuration serves to decrease the friction force generated between the electrifying member and the outer column, and enables the electrifying member to get in contact with the outer column further stably.

Preferably, resin coating is applied over an inner peripheral surface of the outer column or an outer peripheral surface of the inner column. This configuration serves to decrease the friction force generated between the inner column and the outer column, and enables the inner column and the outer column to relatively move by a comparatively small force upon a secondary collision.

Preferably, the steering shaft is configured by fitting a rear steering shaft disposed on the rear side of the vehicle to a front steering shaft disposed on the front side of the vehicle, and the resin coating is applied over the rear steering shaft or the front steering shaft at the fitted portion. With this configuration, the backlash caused at the fitting portion of the steering shaft can be prevented.

Effect of the Invention

According to the steering apparatus of the present invention, it is feasible to provide the steering apparatus ensuring the new electrifying path leading to the car body from the steering wheel.

MODE FOR CARRYING OUT THE INVENTION

In-depth descriptions of embodiments and partially modified examples of applying the present invention to a steering apparatus used for a rack assist electric power steering mechanism of a tilt/telescopic adjustment type (which will hereinafter be simply termed a steering mechanism), will hereinafter be made with reference to the drawings. Note that front-and-rear, right-and-left and up-and-down directions are indicated by arrow lines throughout the drawings, in which positions and directions of respective members will be explained along these definitions of the directions in conjunction with descriptions of the steering mechanism and the steering apparatus. These directions are coincident with directions of a vehicle in a state of mounting the steering apparatus in the vehicle.

Configuration of First Embodiment

Figure 1:
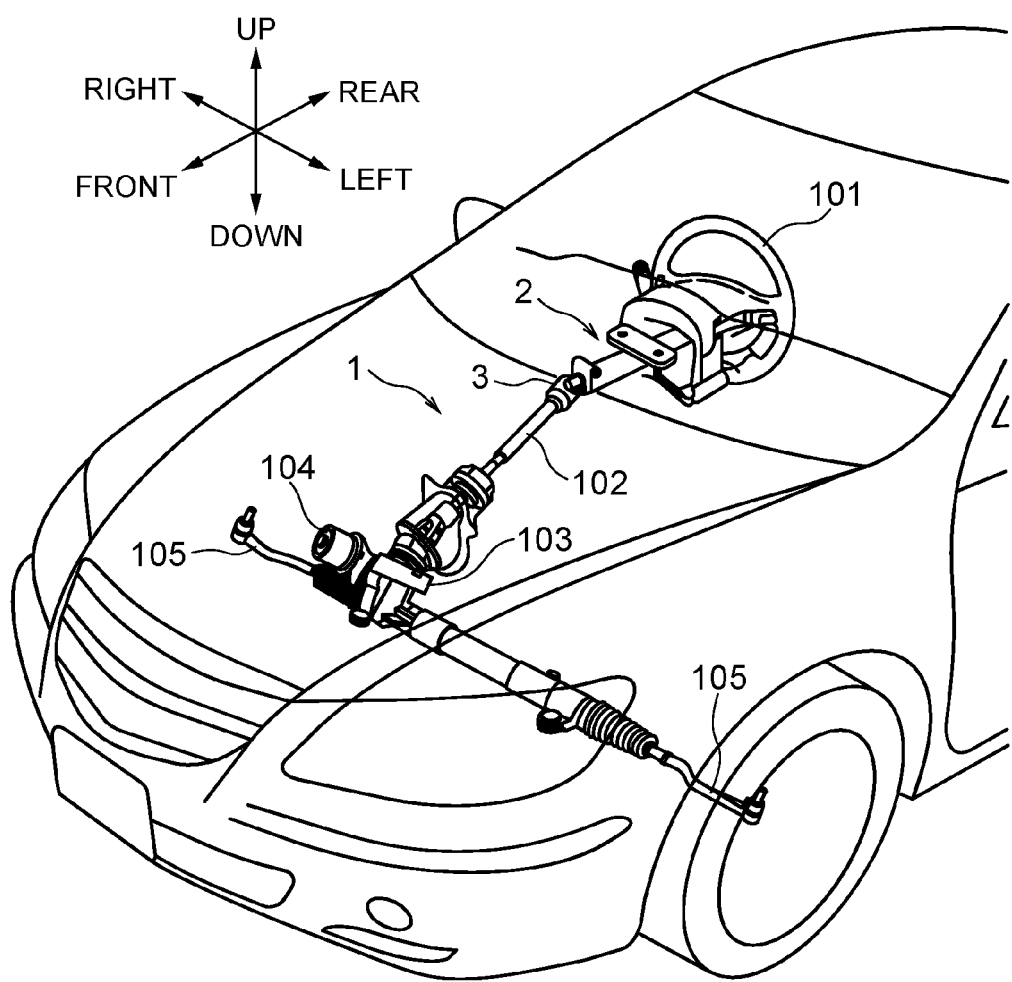
FIG. 1 is a perspective view of a steering mechanism equipped with a steering apparatus according to a first embodiment of the present application as viewed from front in an oblique direction.

FIG. 1 is a perspective view of a steering mechanism 1 equipped with a steering apparatus 2 according to a first embodiment as viewed from an oblique forward direction. As illustrated in FIG. 1, the steering apparatus 2 according to the present embodiment steers front wheels via right-and-left tie rods 105 by reciprocating an unillustrated rack right and left while causing a power-assisted mechanism 104 to assist a steering force transferred to a steering gear 103 from a steering shaft 3 axially supported on a steering column and an intermediate shaft 102 in order to reduce a force required for operating a steering wheel 101.

FIGS. 2 through 5 are respectively a perspective view, a side view, a plan view and a vertical sectional view of the steering apparatus 2 according to the embodiment of the present application. As illustrated in FIGS. 2 through 5, the steering apparatus 2 includes, as main components, a cylindrical outer column 10 manufactured as an aluminum alloy die-cast molded product and building up a front portion, an inner column 11 composed of a steel pipe and building up a rear portion, and a tilt bracket 12 that holds the outer column 10.

(Steering Column)

The steering column is configured to include the outer column 10 disposed on a front side and the inner column 11 disposed on a rear side. The outer column 10 is formed with a holding cylindrical hole 13 (illustrated in FIG. 5) having an inside diameter slightly larger than an outside diameter of the inner column 11 in an axial direction, and the inner column 11 is fitted in this holding cylindrical hole 13.

A resin having a low frictional coefficient is coated over an outer peripheral surface of a region, fitted in the holding cylindrical hole 13, of the inner column 11, whereby the outer column 10 and the inner column 11 relatively slide, resisting a comparatively small clamping friction force, upon a secondary collision that will be stated later on.

Figure 3:
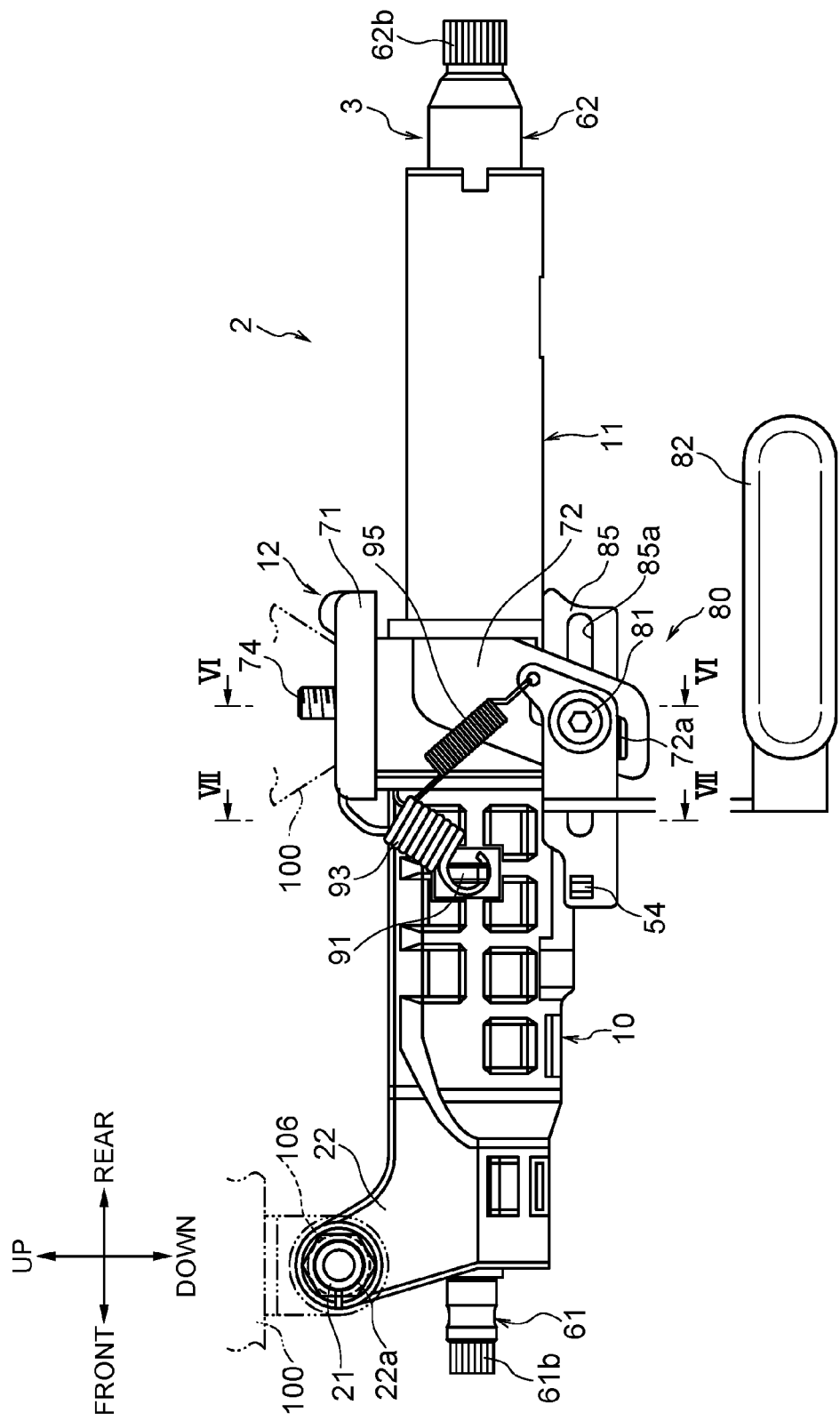
FIG. 3 is a side view of the steering apparatus according to the first embodiment of the present application.

As illustrated in FIG. 3, the outer column 10 has a pivot boss 22 holding a collar 21 composed of the steel pipe in a boss hole 22a penetrating a front end upper portion of the outer column 10 in the right-and-left direction, and is rotatably fitted to a car body 100 via a pivot bolt 106 inserted into the collar 21.

Figure 2:
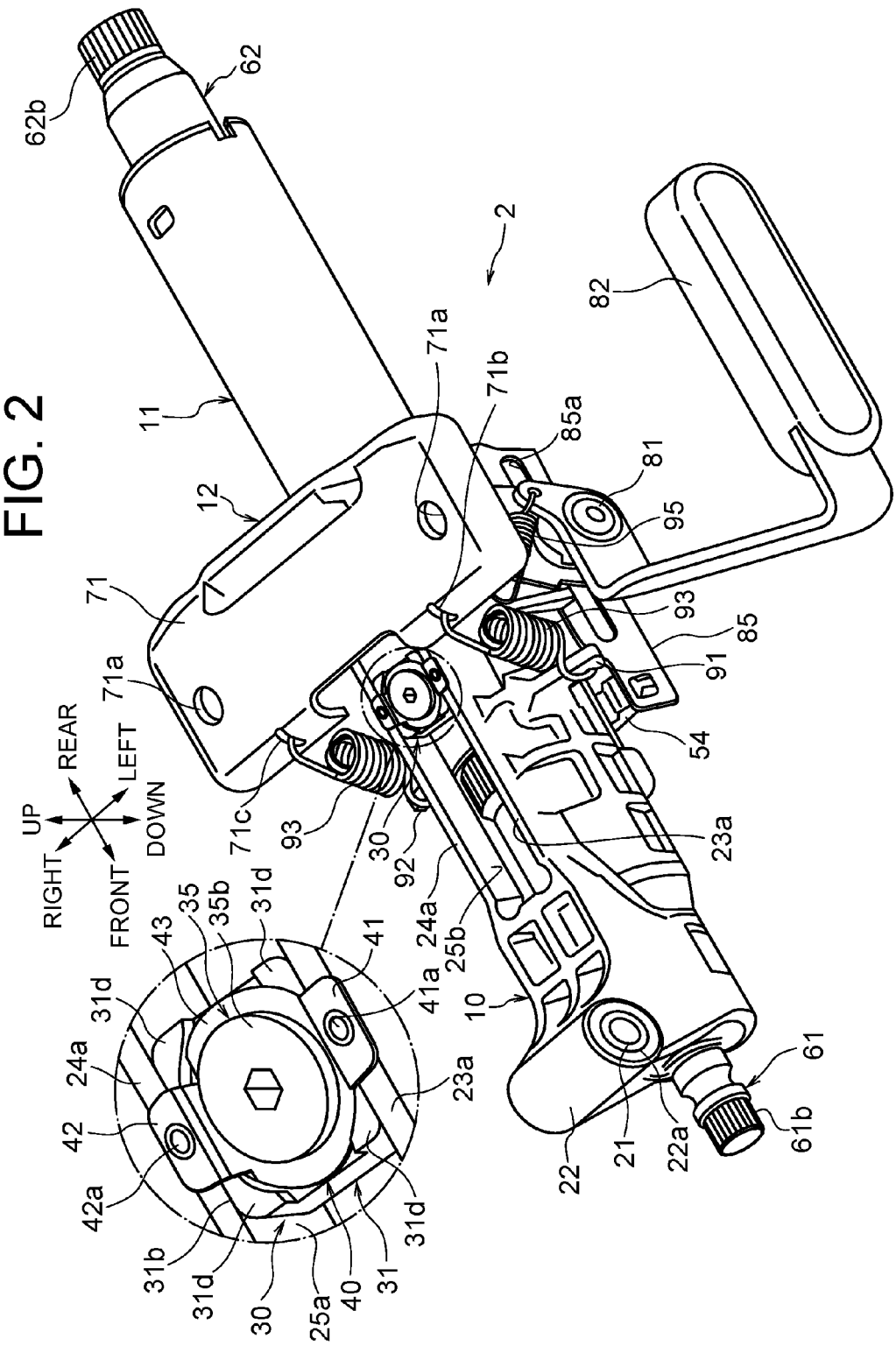
FIG. 2 is a perspective view of the steering apparatus according to the first embodiment of the present application as viewed from front in the oblique direction.
Figure 6:
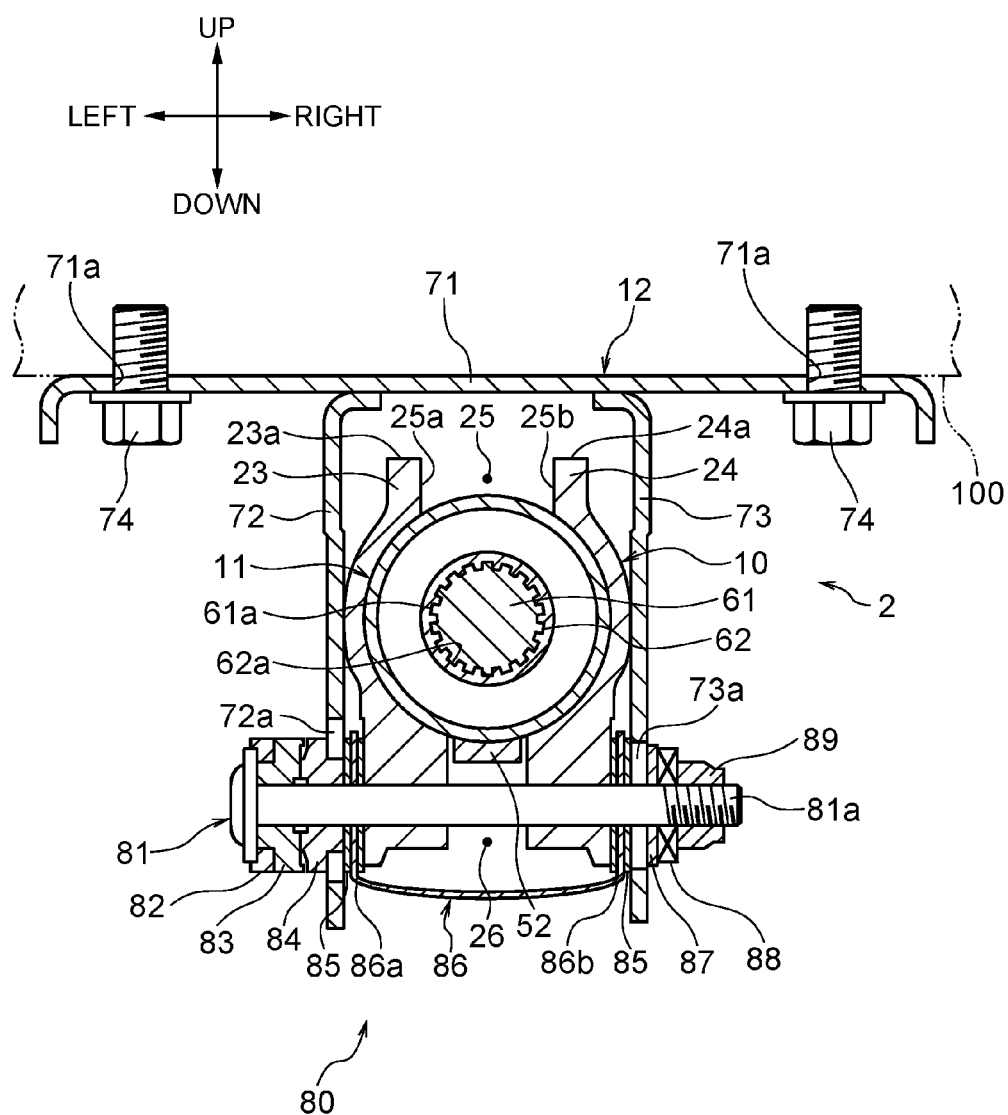
FIG. 6 is a sectional view of the steering apparatus according to the first embodiment of the present application, illustrating a cross-section taken along the line VI-VI in FIG. 3.

As illustrated in FIGS. 2 and 6, a couple of left and right guide walls 23, 24 protruding upward and extending in the front-and-rear direction are formed at an upper portion of the outer column 10, and a guide groove 25 penetrating in radial direction and extending in the front-and-rear direction is provided between these guide walls. A slit 26 penetrating in the radial direction, extending in the front-and-rear direction and being opened on a rear side, is provided in a rear and lower portion of the outer column 10.

Figure 5:
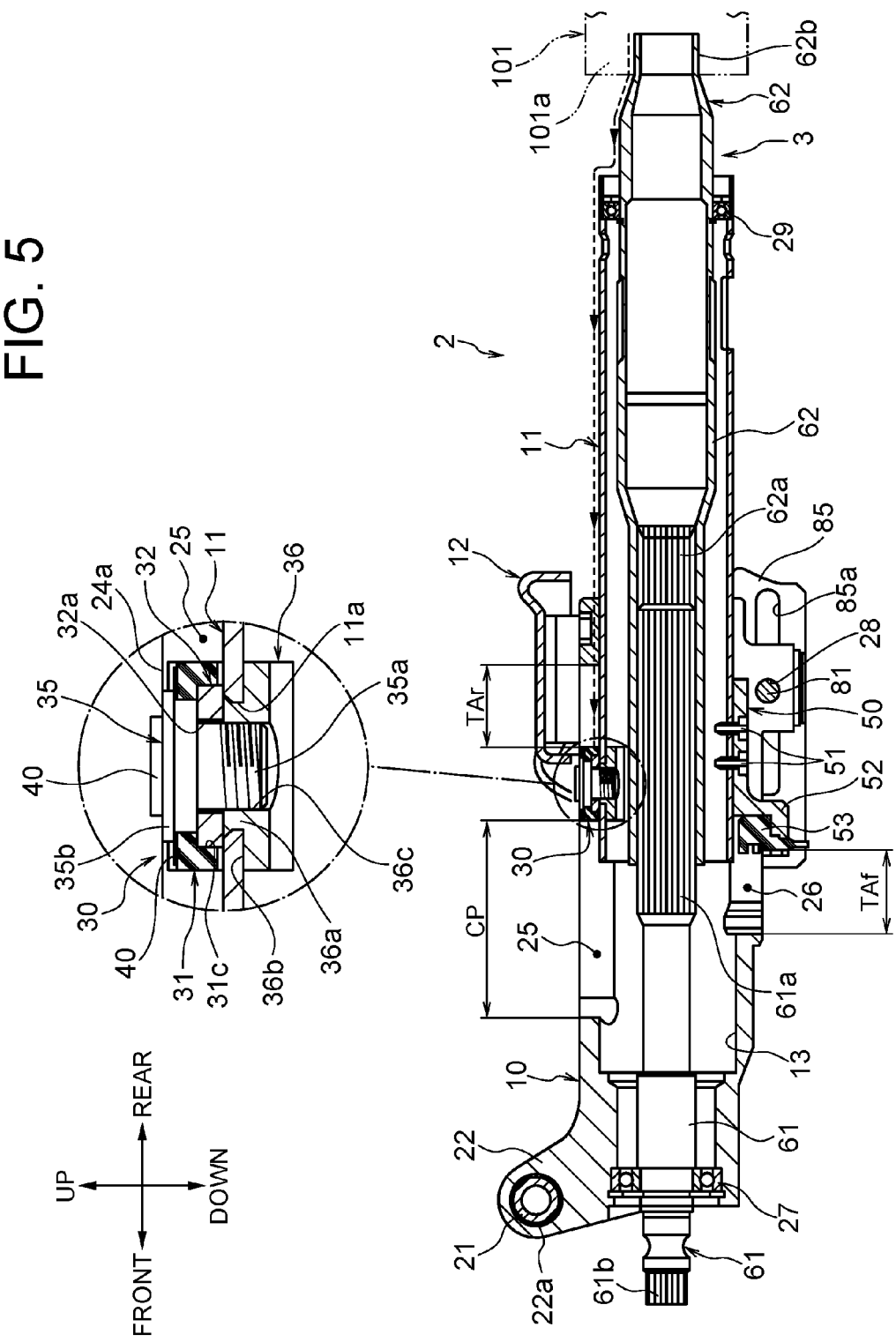
FIG. 5 is a vertical sectional view of the steering apparatus according to the first embodiment of the present application.

As illustrated in FIG. 5, ball bearings 27 rotatably supporting a front steering shaft (lower shaft) 62, which will be described later on, are fitted internally in the front end portion of the outer column 10. A through-hole 28 for a clamp bolt, which penetrates in the right-and-left direction, is bored in the lower portion on the rear end of the outer column 10, and a clamp bolt 81 of a tilt/telescopic adjustment mechanism 80 to be described later on is inserted in this through-hole 28.

As illustrated in FIG. 5, ball bearings 29 are fitted in the rear end portion of the inner column 11 in order to rotatably support a rear steering shaft (upper shaft) 62 to be described later on.

(Upper Stopper)

Figure 7:
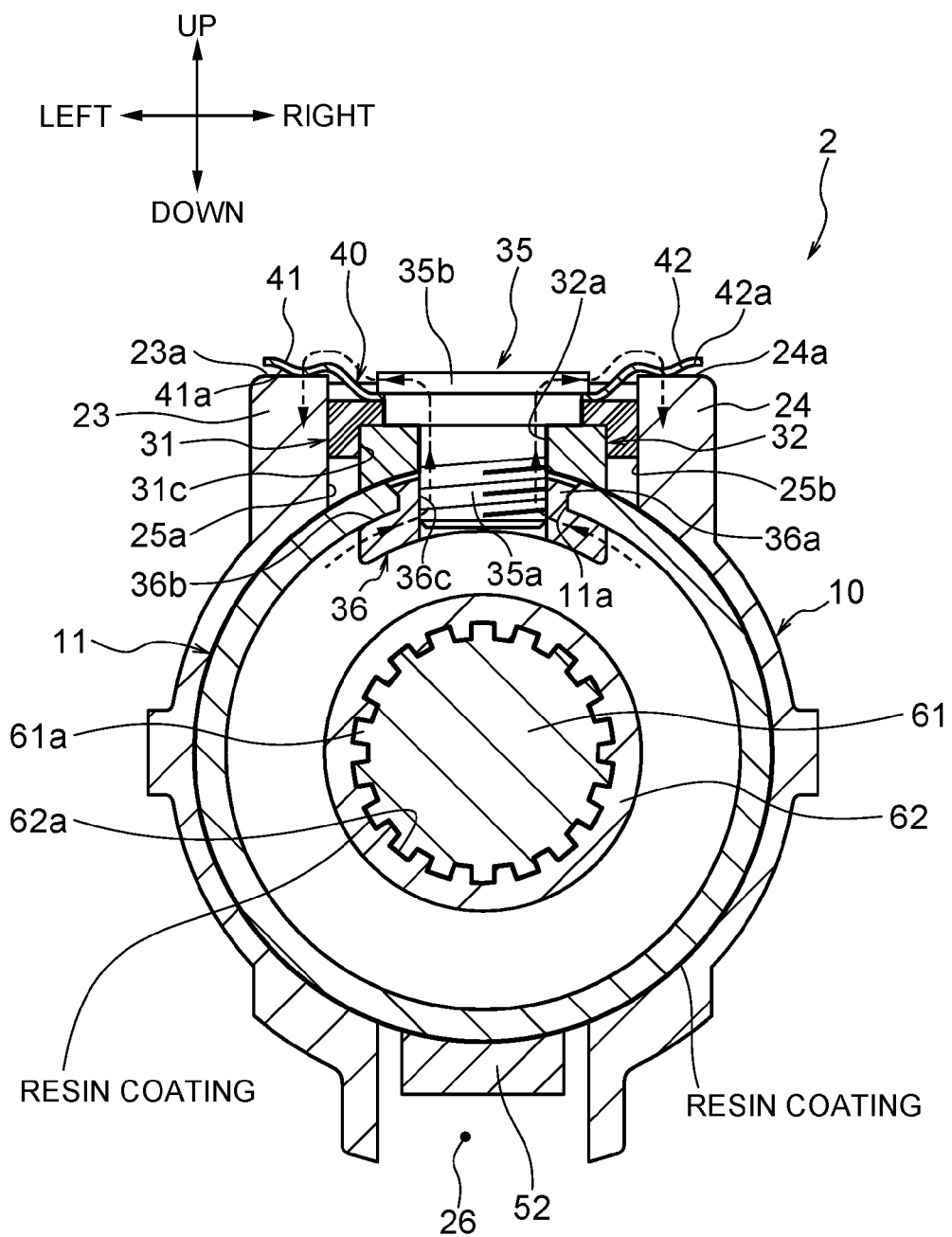
FIG. 7 is a sectional view of the steering apparatus according to the first embodiment of the present application, illustrating a cross-section taken along the line VII-VII in FIG. 3.

As illustrated in FIGS. 5 and 7, an upper stopper 30 engaging with the guide groove 25 of the outer column 10 is fitted to a front-sided upper surface of inner column 11. This engagement between the guide groove 25 and the upper stopper 30 prevents a relative rotation of the outer column 10 with respect to the inner column 11, and restricts an axis-directional relative movement range of the inner column 11 and the outer column 10. In other words, the upper stopper 30 restricts a backward telescopic adjustment range (indicated by a symbol TAr in FIG. 5) of the inner column 11 by abutting on a rear end of the guide groove 25, and restricts a movement range (indicated by a symbol CP in FIG. 5) of the inner column 11 upon the secondary collision by abutting on a front end of the guide groove 25.

The upper stopper 30 includes a guide member 31 as a resinous injection-molded product and a metallic stopper base 32, the configuration being such that the guide member 31 and the stopper base 32 are fitted to the inner column 11 by metallic fixtures, i.e., a stepped low head bolt 35 with a hexagon socket and a nut plate 36 secured to the inner column 11.

Figure 4:
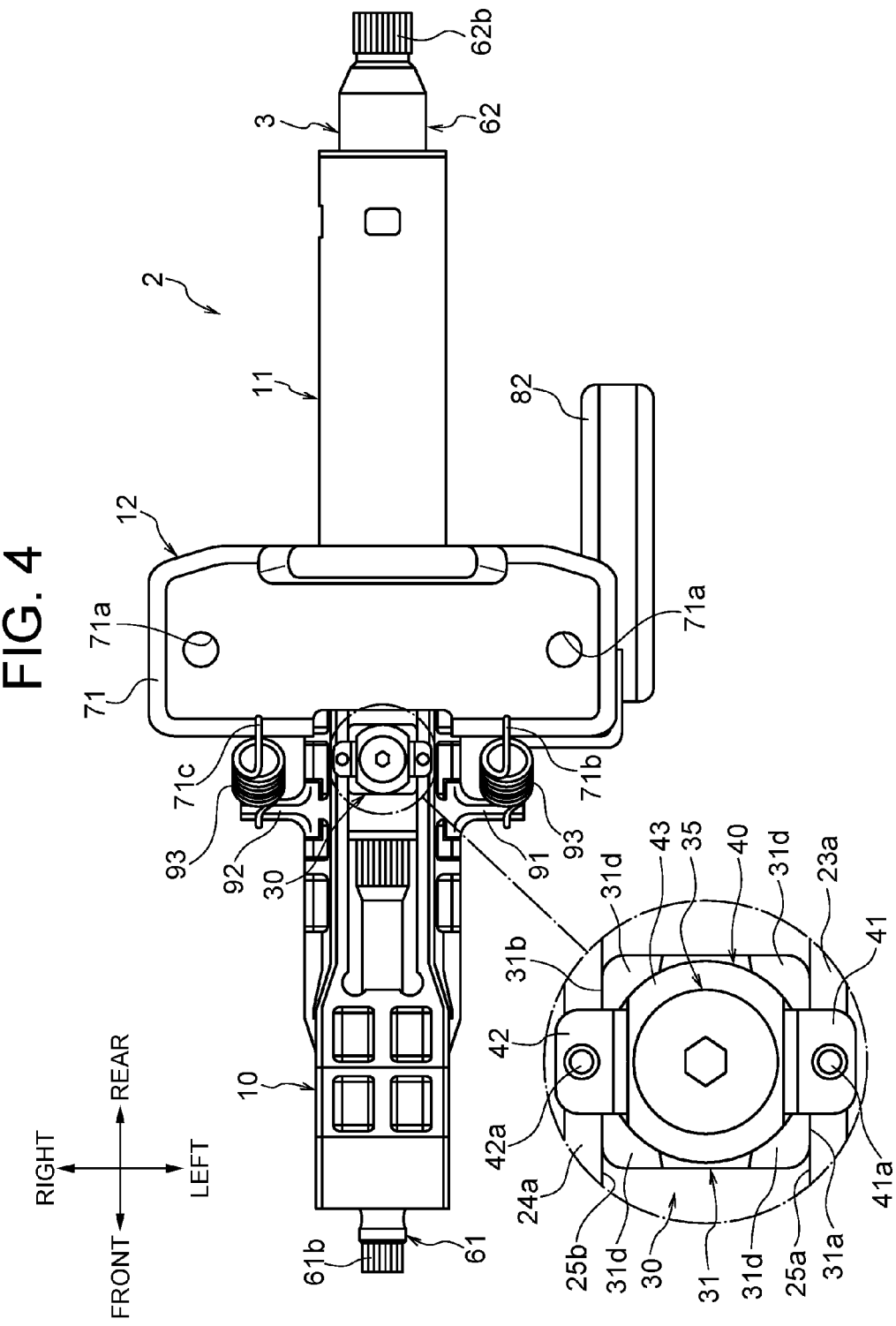
FIG. 4 is a plan view of the steering apparatus according to the first embodiment of the present application.

The guide member 31 takes, as illustrated in FIG. 4, a substantially square shape in planar view, and left and right side edges 31a, 31b of the guide member 31 are in a slidable contact with inner walls 25, 25b of the guide groove 25. A lower portion of the guide member 31 is, as illustrated in FIGS. 5 and 7, formed with a recessed portion 31c into which the stopper base 32 is fitted.

The stopper base 32 is, as illustrated in FIGS. 5 and 7, bored at its center with a through-hole 32a receiving insertion of a screw shaft 35a of the stepped low head bolt 35. The stopper base 32 has a lower surface 32b formed as a curved surface having a curvature corresponding to a curvature of the outer peripheral surface of the inner column 11, whereby the stopper base 32 is, as illustrated in FIG. 7, tightly fitted to the inner column 11 in an assembled state. On the occasion of applying the resin coating described above, a region, as a contact portion with the stopper base 32, of the inner column 11 is masked not to be coated with the resin, thereby enabling electrification upon a direct contact between the stopper base 32 and the outer peripheral surface of the inner column 11.

The nut plate 36 has, as depicted in FIG. 7, a boss 36a, at the center of the upper surface, inserted into a through-hole 11a formed in the inner column 11, and is formed with a screw hole 36c penetrating from an upper end surface of the boss 36a to a lower end. The nut plate 36 includes an upper surface 36b formed as a curved surface having a curvature corresponding to a curvature of the inner peripheral surface of the inner column 11, and is, as illustrated in FIG. 7, tightly fitted to the inner column 11. According to the first embodiment, after securing the stopper base 32 to the inner column 11 by caulking the boss 36a in a state of being inserted into the through-hole 11a, a thread groove of the screw hole 36c is formed by using a tap. Note that the upper stopper 30 may also be fastened to the inner column 11 by a blind rivet in place of the nut plate 36.

(Electrifying Plate)

As illustrated in FIGS. 2, 4 and 7, a circular electrifying plate 40 serving as an electrifying member and having left and right contact pieces 41, 42 is pinched between the guide member 31 and an upper stepped portion 35b of the stepped low head bolt 35. The electrifying plate 40 is prevented from rotating by four stop protrusions 31d protruding from the upper surface of the guide member 31. The electrifying plate 40 is a punching press molded product of a spring steel plate having elasticity, and may also involve using a material such as a phosphor bronze plate other than the spring steel plate, of which the electrifying plate 40 is composed.

The left and right contact pieces 41, 42 of the electrifying plate 40 have contact protrusions 41a, 42a protruding semi-spherically from the lower surface thereof, the left and right contact pieces 41, 42 rising obliquely upwardly toward the bilateral sides from an annular plate body 43. The left and right contact pieces are configured so that the contact protrusions 41a, 42a contact upper surfaces 23a, 24a of the guide walls 24, 24 at a predetermined contact pressure in a state of the contact pieces 41, 42 being elastically deformed upward. The contact pieces 41, 42 are thus configured and are thereby enabled to contact always the upper surfaces 23a, 24a, while following slight corrugations of the upper surfaces 23a, 24a and displacements of the inner column 11 in the radial direction. Note that the upper surfaces 23a, 24a may be smoothly finished by grinding to attain stable contacts with the contact protrusions 41a, 42a.

(Lower Stopper)

As illustrated in FIG. 5, a lower stopper 50 manufactured as an aluminum alloy die-cast molded product and loosely fitted in the slit 26, is attached to the front end sided lower surface of the inner column 11. In the case of the first embodiment, a below-mentioned buffer block 53 abuts on a front end of the slit 26, whereby the lower stopper 50 restricts a forward telescopic adjustment range (indicated by a symbol TAf in FIG. 5) of the inner column 11.

The lower stopper 50 is fixed to the inner column 11 by a couple of front-and-rear resin pins 51, in which the buffer block 53 collides with the front end of the slit 26 upon the secondary collision, and the resin pins 51 are thereby fractured to come off the inner column 11, thus permitting a further forward movement of the inner column 11.

A buffer retaining portion 52 taking substantially an L-shape is formed in protrusion directed downward at a front end of the lower stopper 50, and the buffer block 53 composed of a rubber is fitted to this buffer retaining portion 52. Note that engaging arms 54 (illustrated in FIG. 3), with which friction plates 85 engage, extend from bilateral side surfaces of the lower stopper 50.

(Steering Shaft)

As depicted in FIG. 5, the steering shaft 3 is configured to include a front steering shaft 61 and a rear steering shaft 62 that are spline-joined within the steering column to enable the telescopic adjustment. The steering shaft 3 is, as described above, rotatably supported by the ball bearings 27 inserted in the front end of the outer column 10 and the ball bearings 29 inserted in the rear end of the inner column 11.

The front steering shaft 61 is formed by rolling and broaching a steel round bar used as a material, and includes a male spline 61a formed along an outer periphery of a second half portion thereof. On the other hand, the rear steering shaft 62 is formed by drawing and broaching a steel pipe used as a material, and includes a female spline 62a formed along an inner periphery of a first half portion thereof and fitted to the male spline 61a of the front steering shaft 61.

The resin coating is applied over the male spline 61a of the front steering shaft 61 to prevent a backlash with the female spline 62a of the rear steering shaft 62. Note that the resin coating may be replaced by coating a low friction material.

A serration 61b, on which a universal joint (unillustrated) is fitted, is formed on a front end of the front steering shaft 61, and a serration 62b, on which a boss 101a (indicated by a broken line in FIG. 5) of the steering wheel 101 is fitted, is formed in a rear end of the upper steering shaft 62.

(Tilt Bracket)

As illustrated in FIGS. 3 and 6, the tilt bracket 12 includes an upper plate 71 extending bilaterally, and left and right side plates 72, 73 welded to a lower surface of the upper plate 71. The upper plate 71 is fastened to the car body 100 by a bolt 74 inserted into a bolt hole 71a. An interval between the left and right side plates 72 and 73 is set slightly larger than a lateral width of the outer column 10 in a free state. The left and right side plates 72, 73 are formed with tilt adjustment elongate holes 72a, 73a. Each of the tilt adjustment elongate holes 72a, 73a is formed in a circular arc shape about the pivot boss 22 described above.

As depicted in FIG. 6, the tilt/telescopic adjustment mechanism 80 used for making the tilt adjustment and the telescopic adjustment of the steering column 2, is provided at the lower portion of the tilt bracket 12. The tilt/telescopic adjustment mechanism 80 performs clamping and declamping corresponding to a user's operation by the clamp bolt 81 inserted from left side into the clamp bolt through-hole 28 of the outer column 10, thereby fixing and unfixing a tilt/telescopic position.

As illustrated in FIG. 6, an operation lever 82, a movable cam 83 and a fixed cam 84 are fitted on the clamp bolt 81 between a bolt head 81a thereof and a left side plate 72 of the tilt bracket 12, in which the operation lever 82 is rotationally operated by a driver, the movable cam 83 rotates integrally with the operation lever 82, and a right portion of the fixed cam 84 engages in a rotation-disabled manner with the tilt adjustment elongate hole 72a. Inclined cam surfaces taking complementary shapes are formed on respective face-to-face end surfaces of the fixed cam 84 and the movable cam 83. Corresponding to rotations of the operations of the operation lever 82, the fixed cam 84 and the movable cam 83 mesh with each other and are thus in close proximity, thereby releasing the clamping caused by the clamp bolt 81 and clamping by generating a tension on the clamp bolt 81 while moving away from each other in repulsion.

As shown in FIG. 6, between the outer column 10 and the left and right side plates 72, 73 of the tilt bracket 12, left and right each two friction plates 85 whose leading ends engage with a locking arm 54 of a lower stopper 50, and an intermediate friction plate 86 having left and right end plates 86a, 86b which are, respectively, interposed in between the each two friction plates 85, are externally fitted on the fastening bolt 81. The friction plates 85, which engage with the lower stopper 50 as described above, increase the number of friction surfaces and reinforce the force for holding the inner column 11.

As illustrated in FIGS. 3 and 5, each friction plate 85 is provided with an elongate hole 85a extending in the frontand-rear direction to enable the telescopic adjustment by permitting a relative movement with respect to the clamp bolt 81. The intermediate friction plate 86 takes such a shape that a couple of left and right end plates 86*a*, 86*b*, i.e., a couple of square plate members, at their centers formed with round holes to permit the insertion of the clamp bolt 81, are connected by a connection plate 86*c*.

As illustrated in FIG. 6, a pressing plate 87 and a thrust bearing 88 are fitted on the clamp bolt 81 outwardly of the right side plate 73, and are clamped together with other members by a nut 89 screwed along a male screw 81*a* of the clamp bolt 81.

As depicted in FIGS. 2 and 4, hook portions 91, 92 protruding in a horizontal direction are provided at the right and left side surfaces of the outer column 10, and coil springs 93 are bridged over between the hook portions 91, 92 and left and right engaging holes 71*b*, 71*c* bored in the upper plate 71 of the tilt bracket 12. The coil spring 93 lightens the driver's operation for the tilt adjustment by sharing part of weights of the steering column and steering wheel 101 etc. when making the tilt adjustment.

As illustrated in FIG. 3, the coil spring 95 is bridged also between the operation lever 82 and the tilt bracket 12. The coil spring 95 biases the operation lever 82 to rotate on a clamping side, thereby lightening the user's operation of the operation lever 82 when operating on the clamping side, and preventing the operation lever 82 from rotating on the declamping side against a driver's intention due to oscillations and other equivalent motions of the automobile.

Operation of First Embodiment

As illustrated in FIG. 6, when the driver rotates the operation lever 82 on the clamping side, a thread of the inclined cam surface of the movable cam 83 runs up onto a thread of the inclined cam surface of the fixed cam 84, thereby pulling the clamp bolt 81 leftward on one hand and pressing the fixed cam 84 rightward on the other hand. This action causes the left and right side plates 72, 73 to clamp a lower portion of the outer column 10 from the bilateral sides to thereby restrict the steering column from moving in a tilt direction, and simultaneously the inner column 11 is restricted from moving in the axial direction by a clamping friction force generated for the outer column 10 to clamp the inner column 11 and by a friction force generated on the friction plate 85.

When the driver rotates the operation lever 82 in the declamping direction, each of the left and right side plates 72, 73, of which an interval in the free state is larger than the width of the outer column 10 as described above, resiliently returns. This action cancels both of the restriction on the tilt-directional movement of the outer column 10 and the restriction on the axis-directional movement of the inner column 11, thereby enabling the user to adjust the position of the steering wheel 101.

In the first embodiment, even when setting large the clamping force of the outer column 10 by the tilt/telescopic adjustment mechanism 80, the resin having the low frictional coefficient is coated over the outer peripheral surface of the inner column 11, and hence the clamp friction force generated when the outer column 10 clamps the inner column 11 is kept low. With this configuration, even if the driver having a light weight secondarily collides with the steering wheel 101 upon the collision of the automobile, the inner column 11 moves forward relatively easily, thus relieving an impact of the secondary collision. The resin coating having the low frictional coefficient can keep the low clamp friction force even when decreasing a working accuracy of the holding cylindrical hole 13 of the outer column 10, and therefore a working cost can be also reduced.

The inner column 11 moves forward due to the impact caused upon the secondary collision, at which time the buffer block 53 attached to the lower stopper 50 collides with the end portion, on the front side of the vehicle, of the slit 26. When the inner column 11 further moves forward from this state, shear fractures of the resin pins 51 occur, and the inner column 11 releases from the lower stopper 50 and is thereby enabled to move still further forward without restricting the movement by the friction plate 85.

(Action of Electrifying Plate)

The steering apparatus 2 according to the first embodiment also ensures, as indicated by arrowhead broken lines in FIG. 5, the electrifying path extending from the steering wheel 101 to the inner column 11 continuously via the rear steering shaft 62 and the ball bearings 29. However, the resin coating is applied over the outer periphery of the inner column 11, and therefore the electrifying path leading directly to the outer column 10 from the inner column 11 is cut off. In the steering apparatus 2 according to the first embodiment, the resin coating is applied over the male spline 61*a* of the front steering shaft 61, and hence the electrifying path leading to the front steering shaft 61 from the rear steering shaft 62, to which the steering wheel 101 is fitted, is also cut off.

The electrifying plate 40 is configured to solve this problem and serves to ensure the electrifying path leading continuously to the car body 100 from the inner column 11 in a manner described below. To be specific, as indicated by arrowhead broken lines, there is ensured an electrifying path leading to the outer column 10 continuously from the inner column 11 via the nut plate 36, the stepped low head bolt 35 and the electrifying plate 40 in this sequence. An electrifying path leading continuously to the car body 100 from the outer column 10 via the tilt bracket 12 is also ensured. Note that the car body 100 can be electrified via the pivot boss 22, and, as the case may be, a resin spacer for decreasing the friction and eliminating a backlash is, however, inserted thereinto with the result that the electrifying path is cut off.

Partially Modified Example

Next, two modified examples of the first embodiment will be described with reference to FIGS. 8 and 9. Both of these modified examples are partially different from the first embodiment in terms of shapes of the guide walls 23, 24 and the electrifying plate 40 but are the same as the first embodiment in terms of other configurations, and hence redundant explanations are omitted by marking the portions corresponding to those of the steering apparatus 2 according to the first embodiment with the same reference numerals and symbols as those in the first embodiment.

Figure 8:
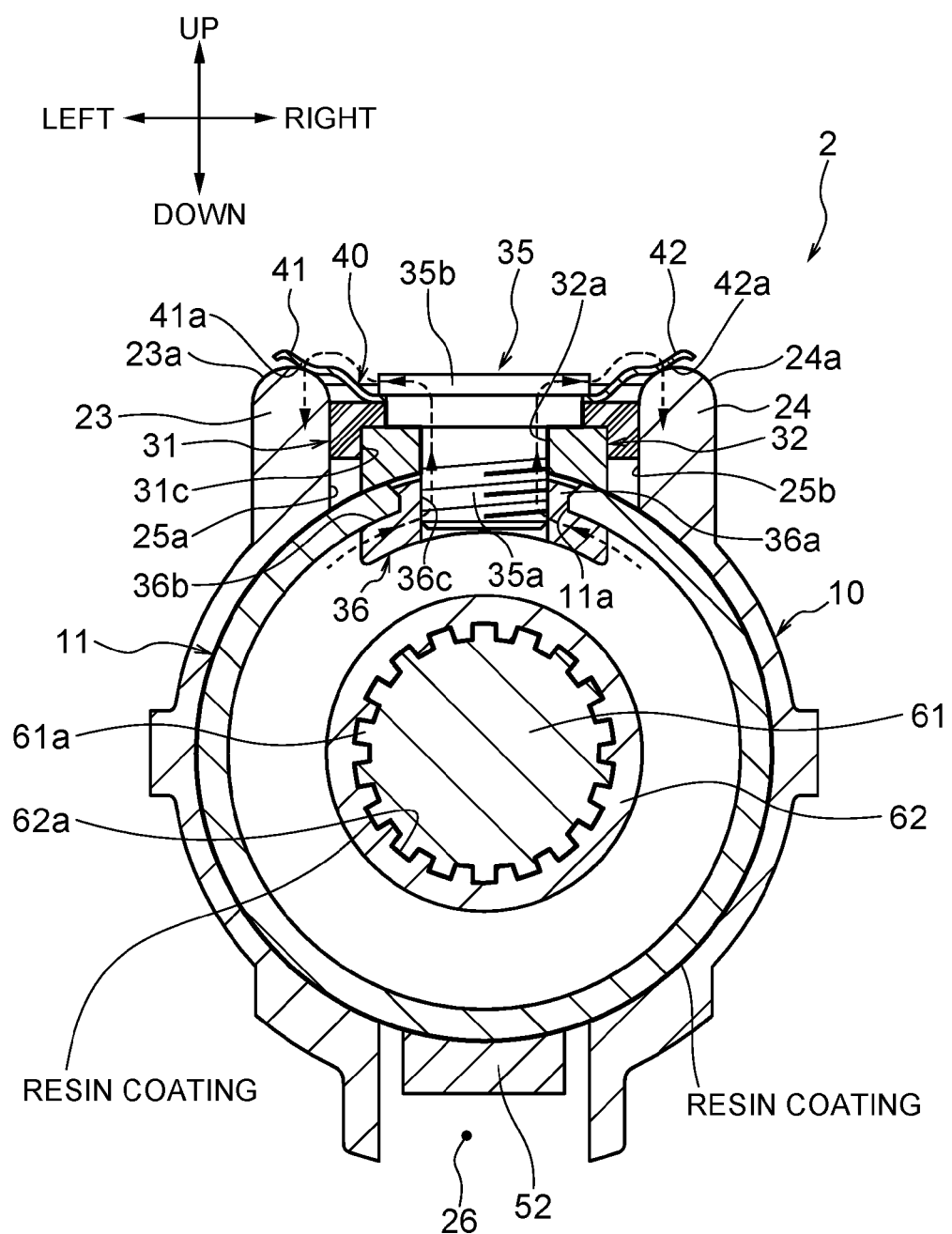
FIG. 8 is a sectional view of a principal portion according to a first modified example of the first embodiment of the present application.

A first modified example illustrated in FIG. 8 is that the upper surfaces 23*a*, 24*a* of the left and right guide walls 23, 24 are curved surfaces, the left and right contact pieces 41, 42 of the electrifying plate 40 elastically become deformed slightly upward, and are thus brought into contact with portions located slightly inward of apexes of the upper surfaces 23*a*, 24*a* at a predetermined contact pressure. This configuration also enables acquisition of the same operation and effect as those in the embodiment discussed above.

Figure 9:
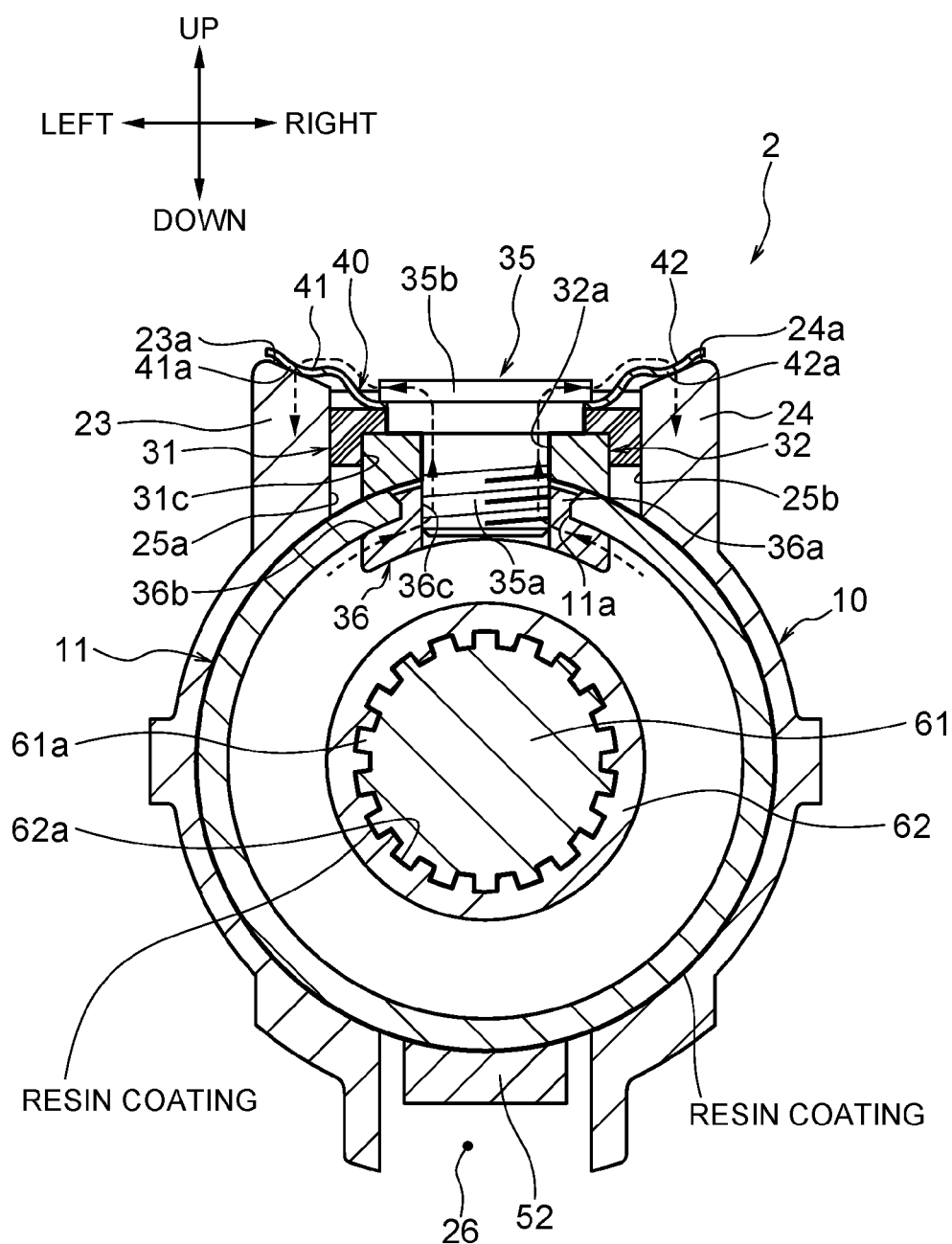
FIG. 9 is a sectional view of a principal portion according to a second modified example of the first embodiment of the present application.

A second modified example illustrated in FIG. 9 is that the upper surfaces 23*a*, 24*a* of the left and right guide walls 23, 24 are inclined surfaces with heights becoming smaller as getting closer to the inward from the outward, the left and right contact pieces 41, 42 of the electrifying plate 40 elastically become deformed slightly upward, and are thus brought into contact with the upper surfaces 23a, 24a at the predetermined contact pressure. This configuration also enables the acquisition of the same operation and effect as those in the embodiment discussed above. A die cutting property upon the die cast molding of the outer column 10 is thereby improved.

Configuration of Second Embodiment

Next, a second embodiment of the present application will be described with reference to FIGS. 10 through 16. A steering apparatus according to the second embodiment is different from the steering apparatus according to the first embodiment in terms of only the electrifying plate, but other components are the same as those in the first embodiment. Accordingly, the discussion on the second embodiment omits the explanations overlapping with the discussion on the first embodiment with marking the portions corresponding to those of the steering apparatus according to the first embodiment with the same reference numerals and symbols as those in the first embodiment.

Figure 10:
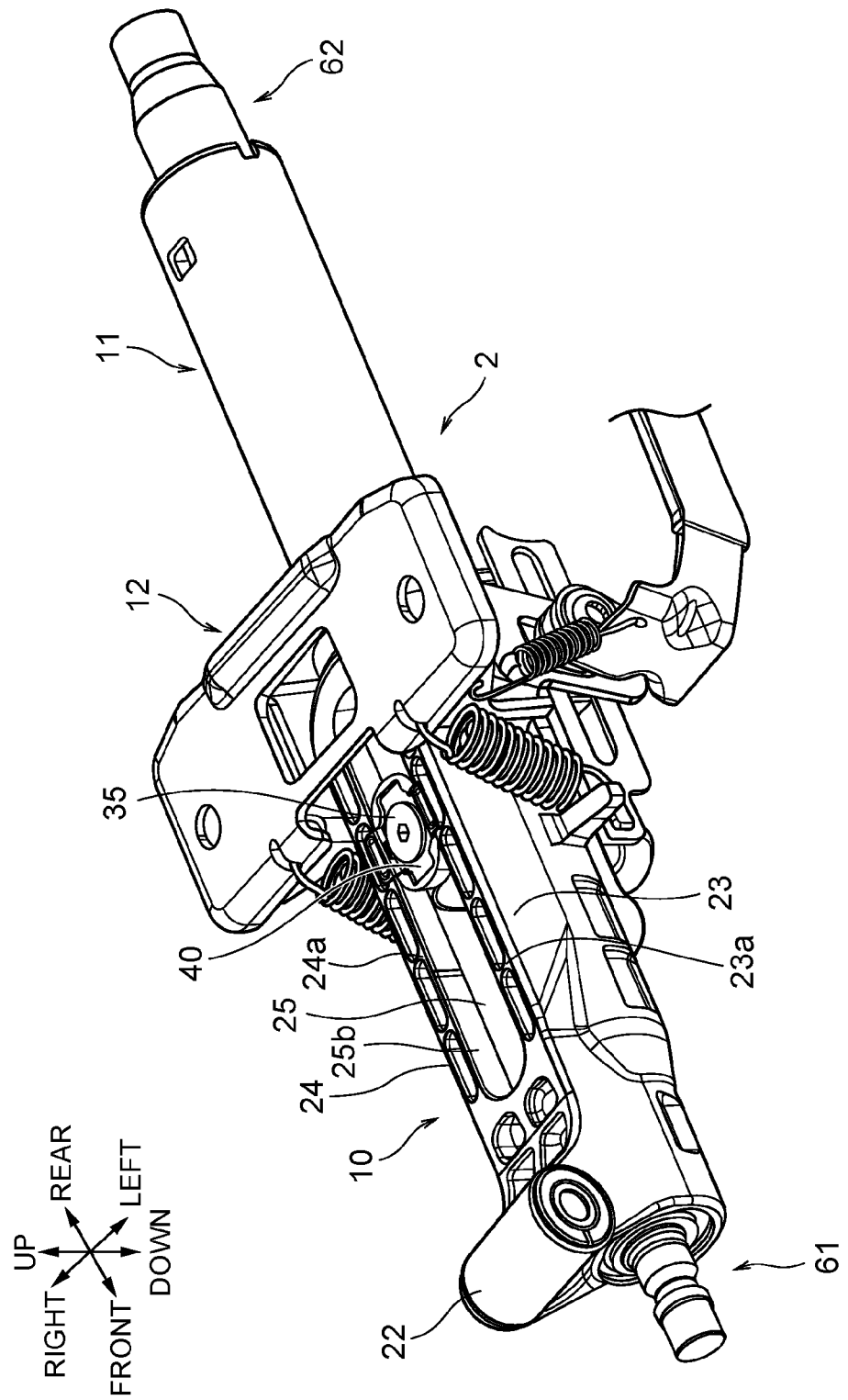
FIG. 10 is a perspective view of the steering apparatus according to a second embodiment of the present application as viewed from front in the oblique direction.
Figure 11:
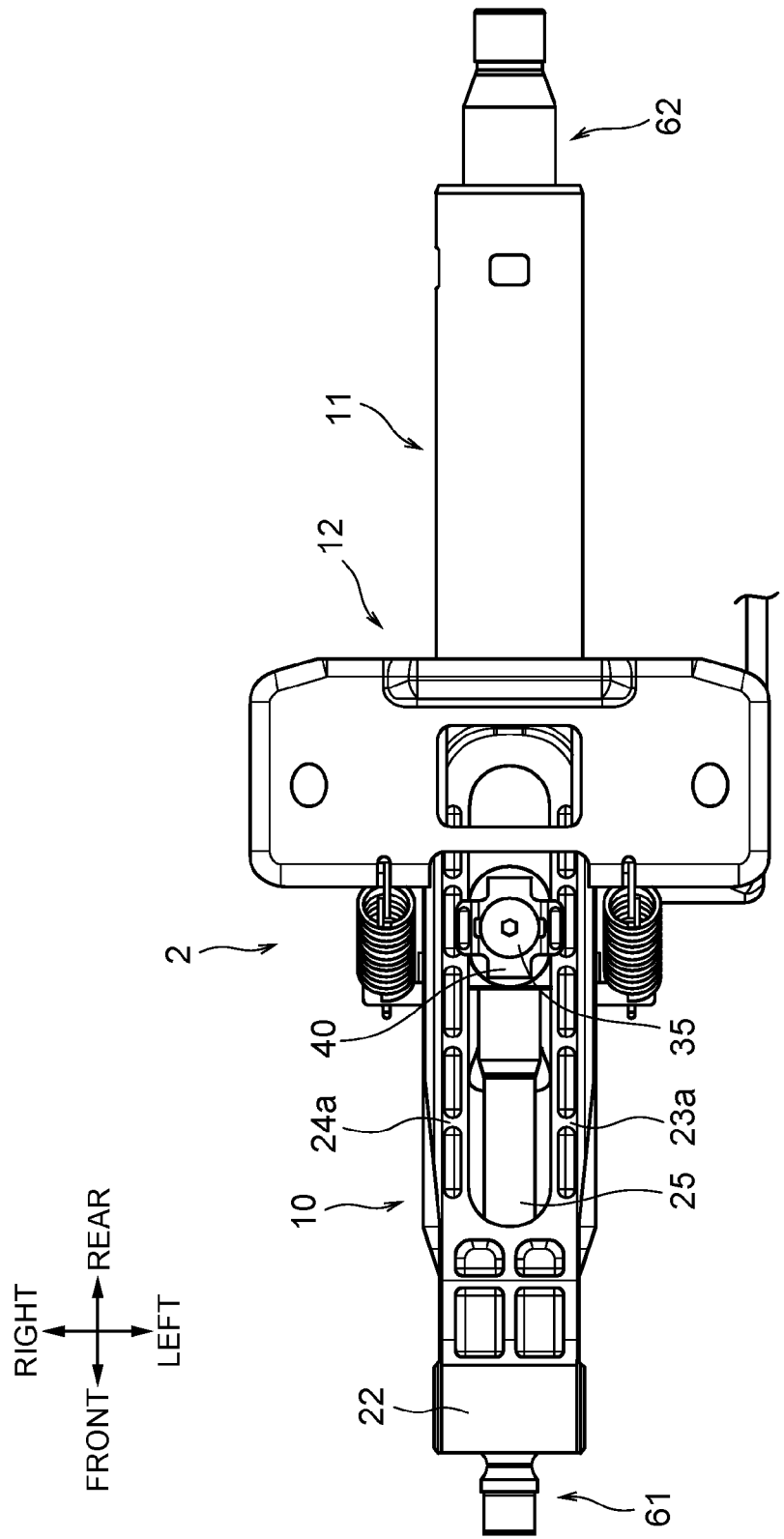
FIG. 11 is a plan view of the steering apparatus according to the second embodiment of the present application.
Figure 12:
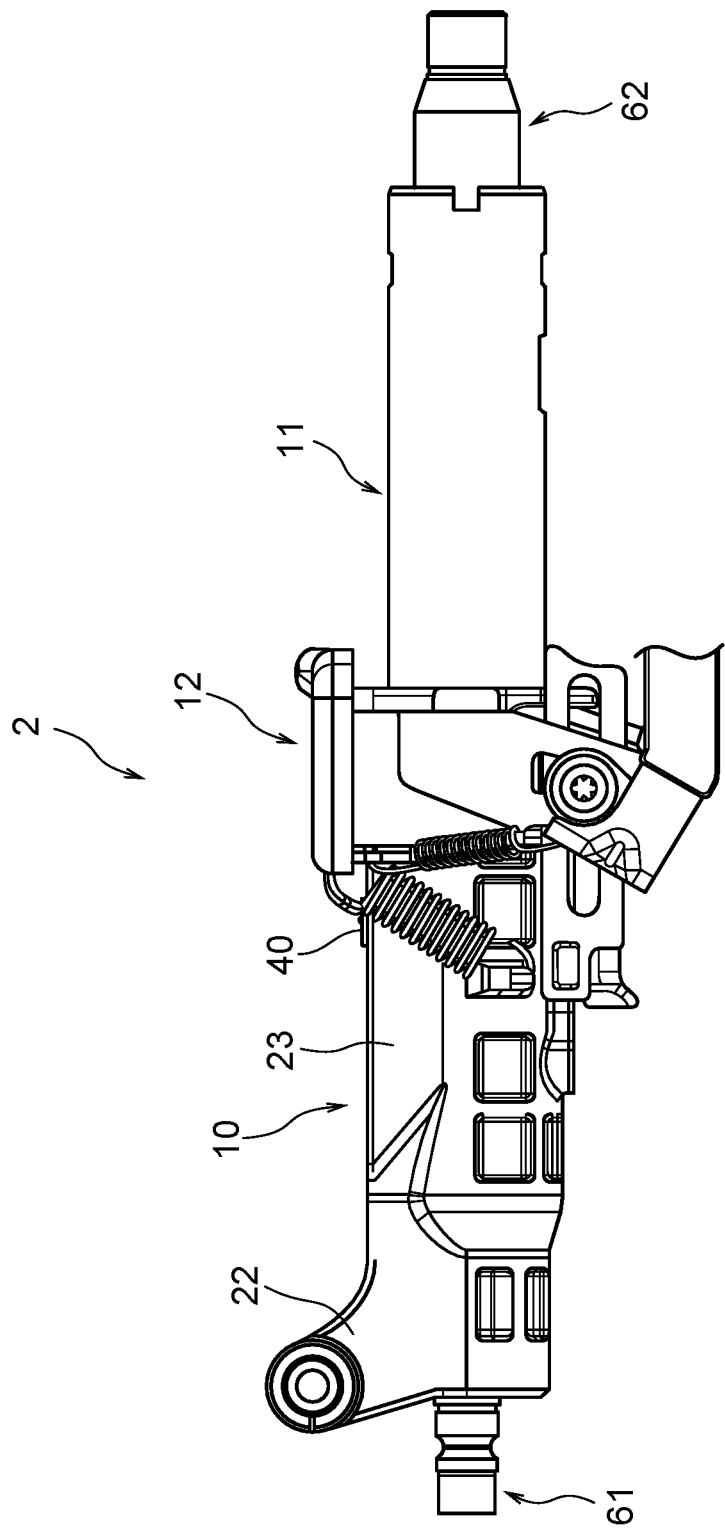
FIG. 12 is a side view of the steering apparatus according to the second embodiment of the present application.

FIG. 10 is a perspective view of a steering apparatus 2 according to the second embodiment as viewed from front in an oblique direction. FIG. 11 is a plan view of the steering apparatus 2 according to the second embodiment. FIG. 12 is a side view of the steering apparatus 2 according to the second embodiment.

As illustrated in FIGS. 10 and 11, in the second embodiment also, the electrifying plate 40 is fixed to the portion, on the front side of the vehicle, of the inner column 11 by the stepped low head bolt 35.

Figure 13:
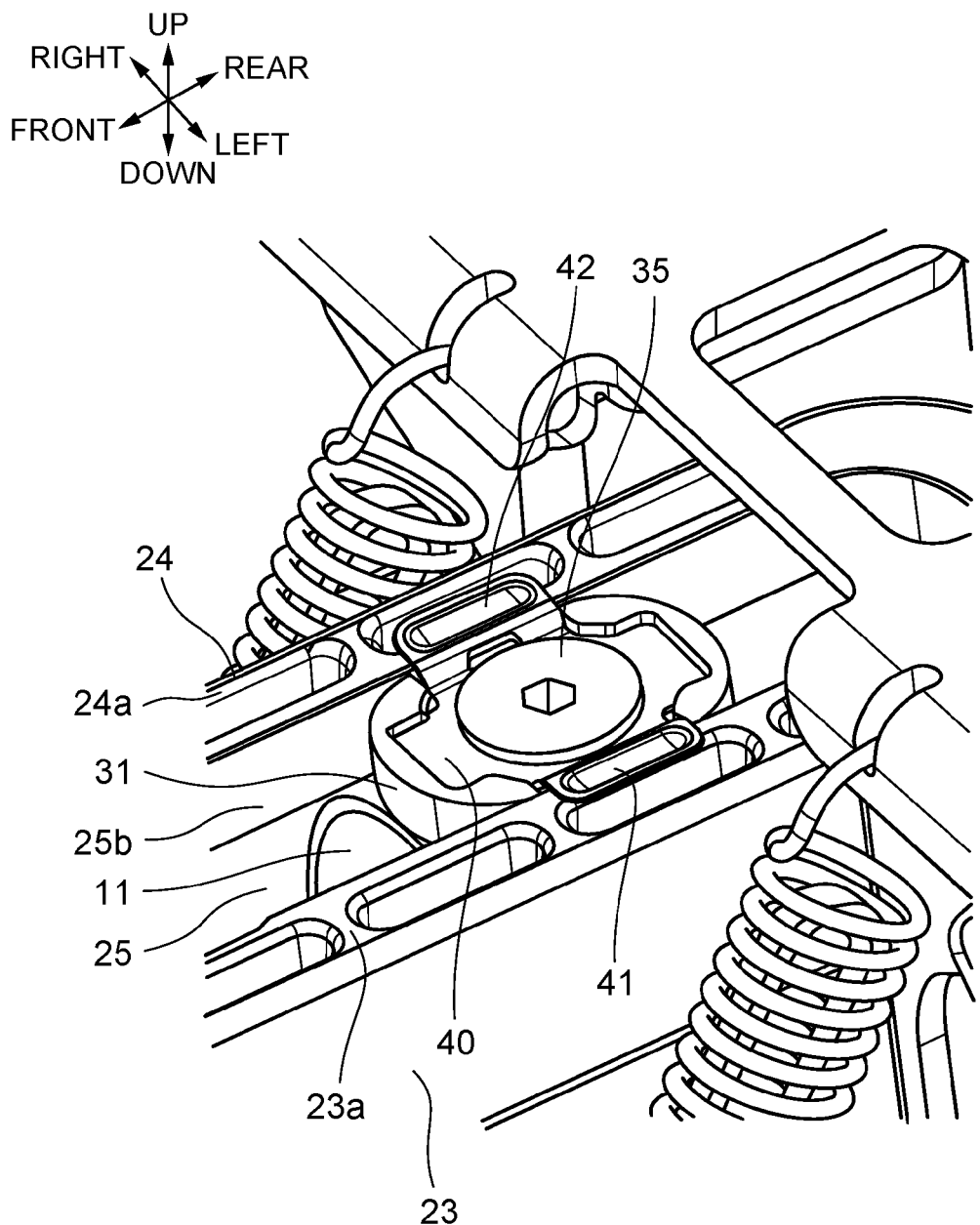
FIG. 13 is an enlarged perspective view of an electrifying plate of the steering apparatus according to the second embodiment of the present application.

FIG. 13 is an enlarged perspective view of a periphery of the electrifying plate 40 of the steering apparatus 2 according to the second embodiment.

The electrifying plate 40 is fitted into a recessed portion so formed in the upper surface of the guide member 31 as to match with the shape of the electrifying plate 40, and is fixed to the inner column 11 together with the guide member 31 by the stepped low head bolt 35. The electrifying plate 40 has a couple of contact pieces 41, 42 disposed left and right, and these contact pieces 41, 42 are in contact with the upper surfaces 23a, 24a of the guide walls 23, 24. The contact pieces 41, 42 are provided bilaterally, i.e., on the left and right sides, whereby at least one of the contact pieces 41, 42 is in contact with the outer column 10 even when the outer column 10 and the inner column 11 relatively rotate upon declamping the inner column 11 from the outer column 10. Reliability on the electrifying path is thereby enhanced.

Figure 14:
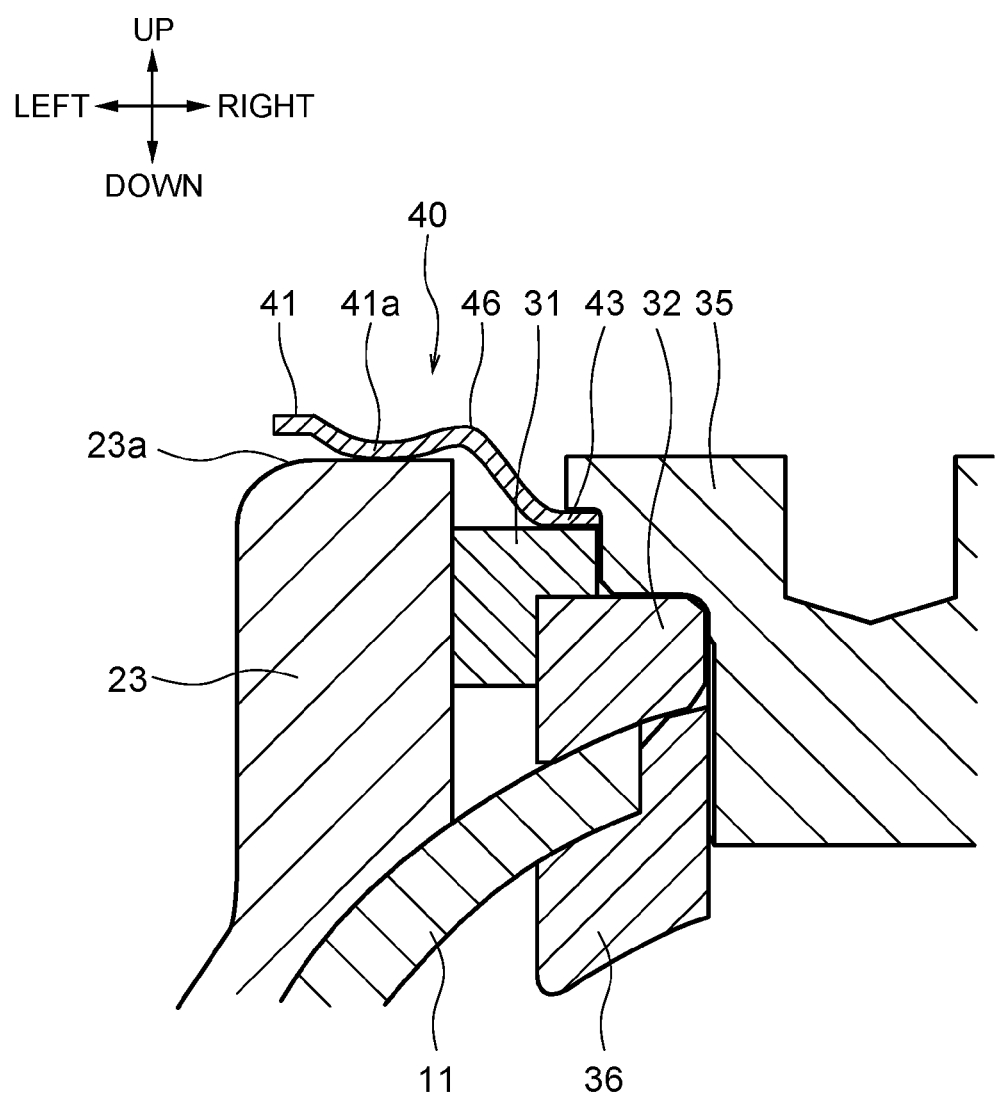
FIG. 14 is a sectional view of a principal portion of the steering apparatus according to the second embodiment of the present application.

FIG. 14 is an enlarged sectional view of a periphery of the contact piece 41 of the steering apparatus 2 according to the second embodiment of the present application. The contact piece 41 will hereinafter be described, and the same is applied to the contact piece 42.

The contact piece 41 has the contact protrusion 41a curved downward, and the lower surface of the contact protrusion 41a is in contact with the upper surface 23a of the guide wall 23. The contact protrusion 41a is formed in a shape of the curved surface with a line of central axis in the front-and-rear direction being centered. Each of the portions, on the front and rear sides of the vehicle, of the contact protrusion 41a is formed in a spherical shape. A flexural portion 46 flexed upward is formed between the contact protrusion 41a and the plate body 43, i.e., at a portion, on a proximal side, of the contact piece. The inner column 11 is declamped from the outer column 10, in which case a backlash occurs between the outer column 10 and the inner column 11, and the flexural portion 46 is, however, elastically deformed with the result that the contact protrusion 41a gets in contact with the upper surface 23a of the guide wall 23 while following the backlash. The reliability on the electrifying path is thereby enhanced.

Figure 15:
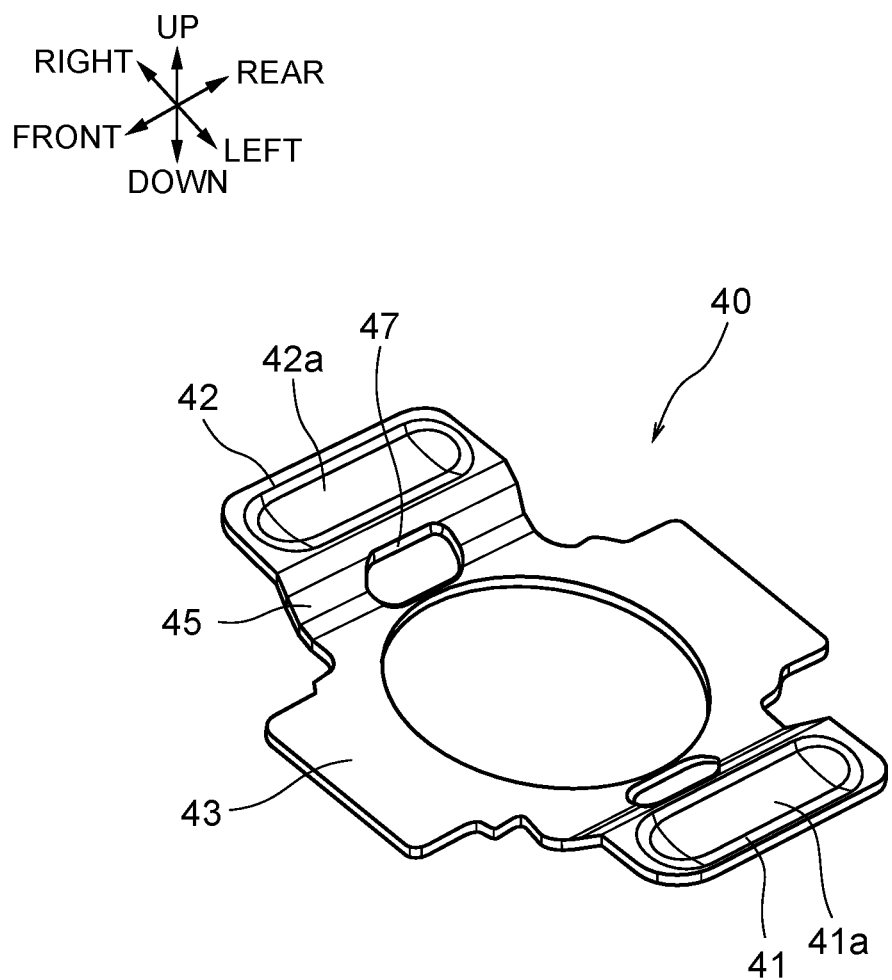
FIG. 15 is a perspective view of the electrifying plate of the steering apparatus according to the second embodiment of the present application.
Figure 16:
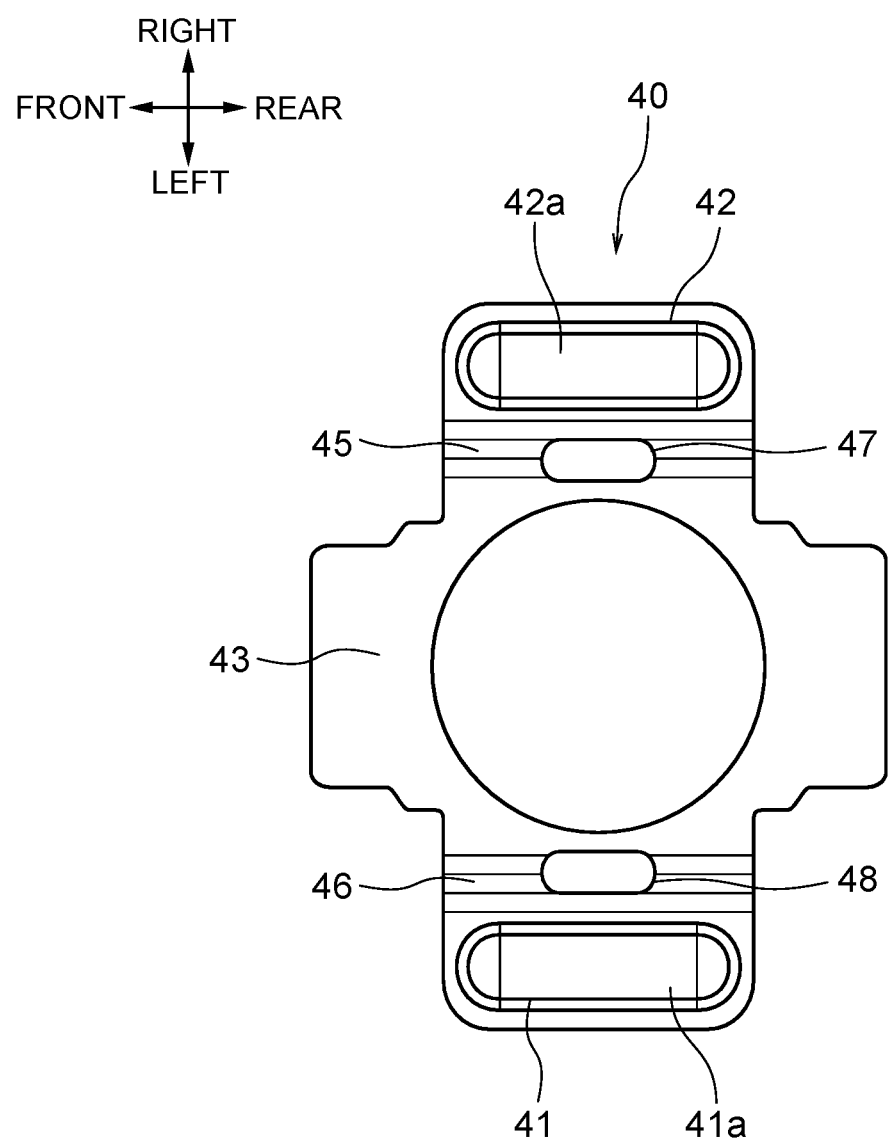
FIG. 16 is a plan view of the electrifying plate of the steering apparatus according to the second embodiment of the present application.

FIG. 15 is a perspective view of the electrifying plate of the steering apparatus 2 according to the second embodiment. FIG. 16 is a plan view of the electrifying plate of the steering apparatus 2 according to the second embodiment.

The electrifying plate 40 is configured to include the plate body 43 fixed to the inner column 11 by the stepped low head bolt 35, and the contact pieces 41, 42 extending left and right from the plate body 43.

The plate body 43 takes a rectangular shape that is elongate in the front-and-rear direction, and is formed at the center with a hole through which the stepped low head bolt 35 passes. Portions, extending forward and backword, of the plate body 43 are hooked by the guide member 31, thus preventing the plate body 43 from rotating.

The contact pieces 41, 42 are, as described above, formed with the contact protrusions 41a, 42a each taking the elongate circular shape being long in the front-and-rear direction. The contact protrusions 41a, 42a are formed in the elongate circular shapes being long in the front-and-rear direction, thereby enabling the electrifying plate 40 to surely get in contact with the outer column 10 even when a gap is formed between the inner column 11 and the outer column 10 upon declamping the inner column 11 from the outer column 10 by operating the operation lever 82 and the inner column 11 is inclined in a range of this gap by a weight of the steering wheel 101.

Elongate circular holes 47, 48, which are elongate in the axial direction, are formed at centers of the flexural portions 45, 46 formed between the contact protrusions 41a, 42a and the plate body 43. According to the second embodiment, unlike the first embodiment, the contact protrusions 41a, 42a take the elongate circular shapes being long in the front-and-rear direction, and hence, when the gap is generated between the inner column 11 and the outer column 10 upon declamping the inner column 11 from the outer column 10 by operating the operation lever 82, the flexural portions 45, 46 are so deformed as to be twisted as the case may be. Such being the case, the formations of the holes 47, 48 facilitate the elastic deformations of the flexural portions 45, 46, thus preventing the fractures of the flexural portions 45, 46.

Operation of Second Embodiment

According to the second embodiment described above, it is feasible to further surely ensure the electrifying path leading continuously to the car body 100 from the inner column 11.

Configuration of Third Embodiment

Next, a third embodiment of the present application will be described with reference to FIGS. 17 through 25. A steering apparatus according to the third embodiment is different from the steering apparatus according to the first embodiment in terms of only the electrifying plate, but other components are the same as those in the first embodiment. Therefore, the discussion on the third embodiment omits explanations overlapping with the discussion on the first embodiment by marking the portions corresponding to those of the steering apparatus according to the first embodiment with the same reference numerals and symbols as those in the first embodiment.

Figure 17:
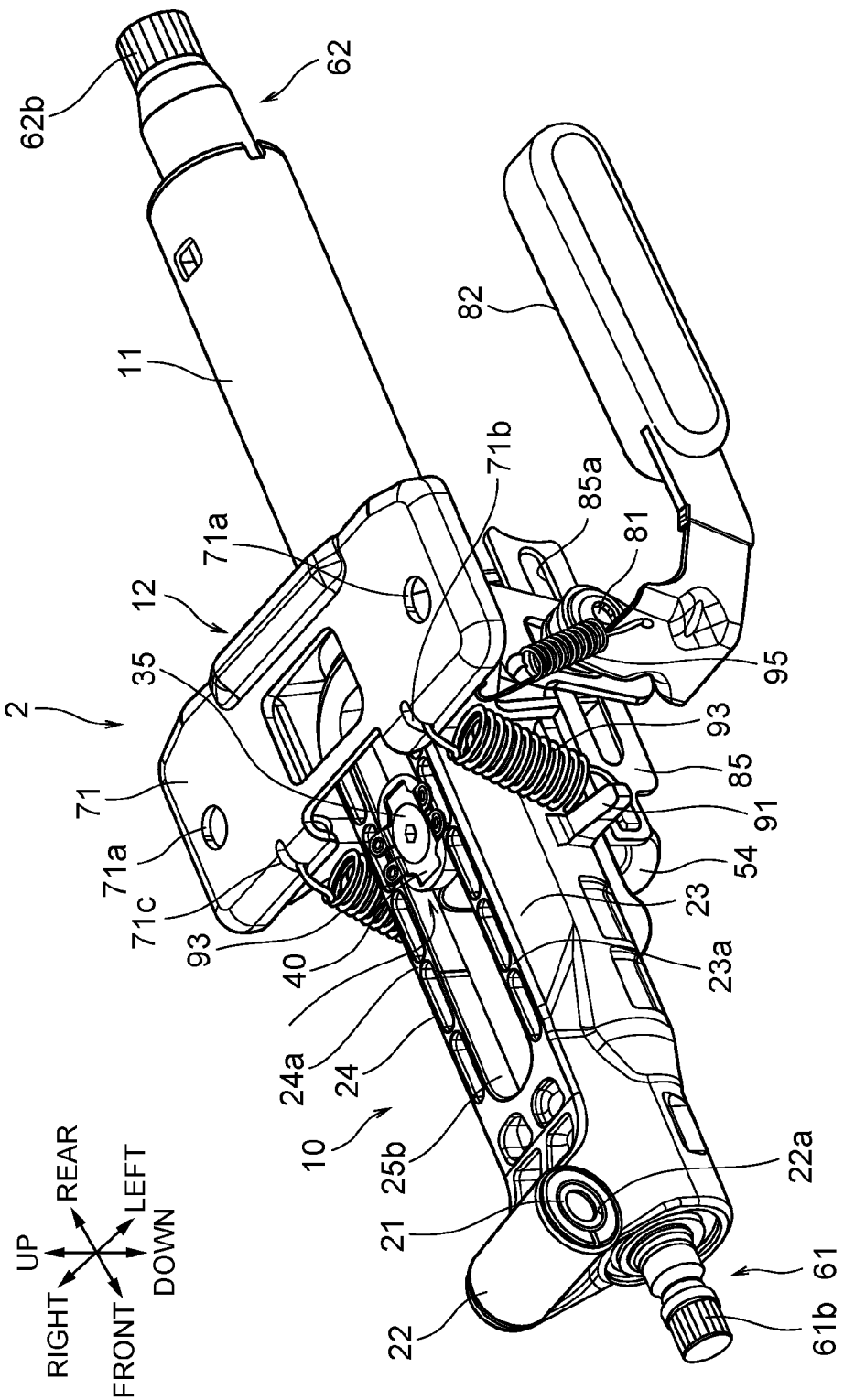
FIG. 17 is a perspective view of the steering apparatus according to a third embodiment of the present application as viewed from front in the oblique direction.
Figure 18:
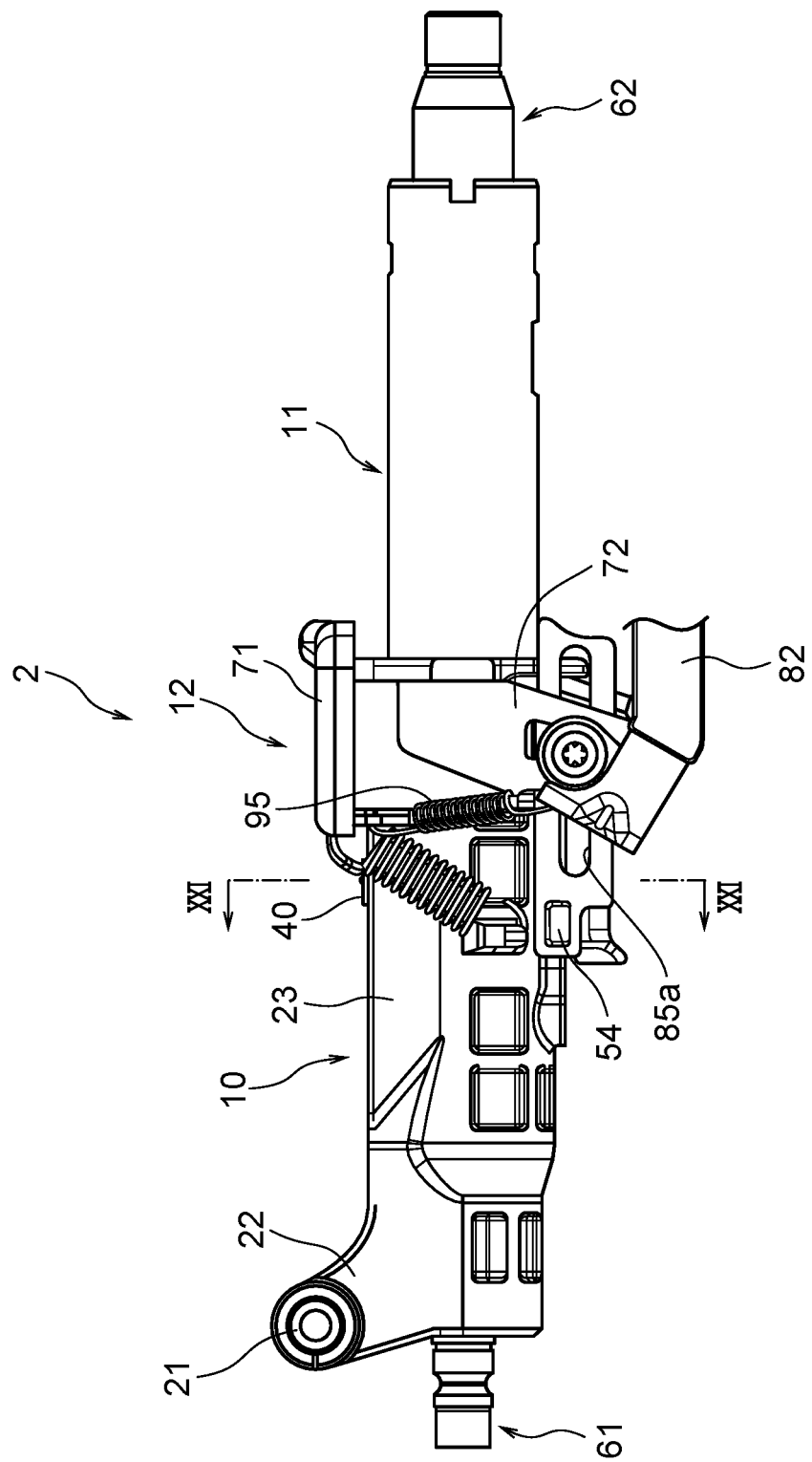
FIG. 18 is a side view of the steering apparatus according to the third embodiment of the present application.
Figure 19:
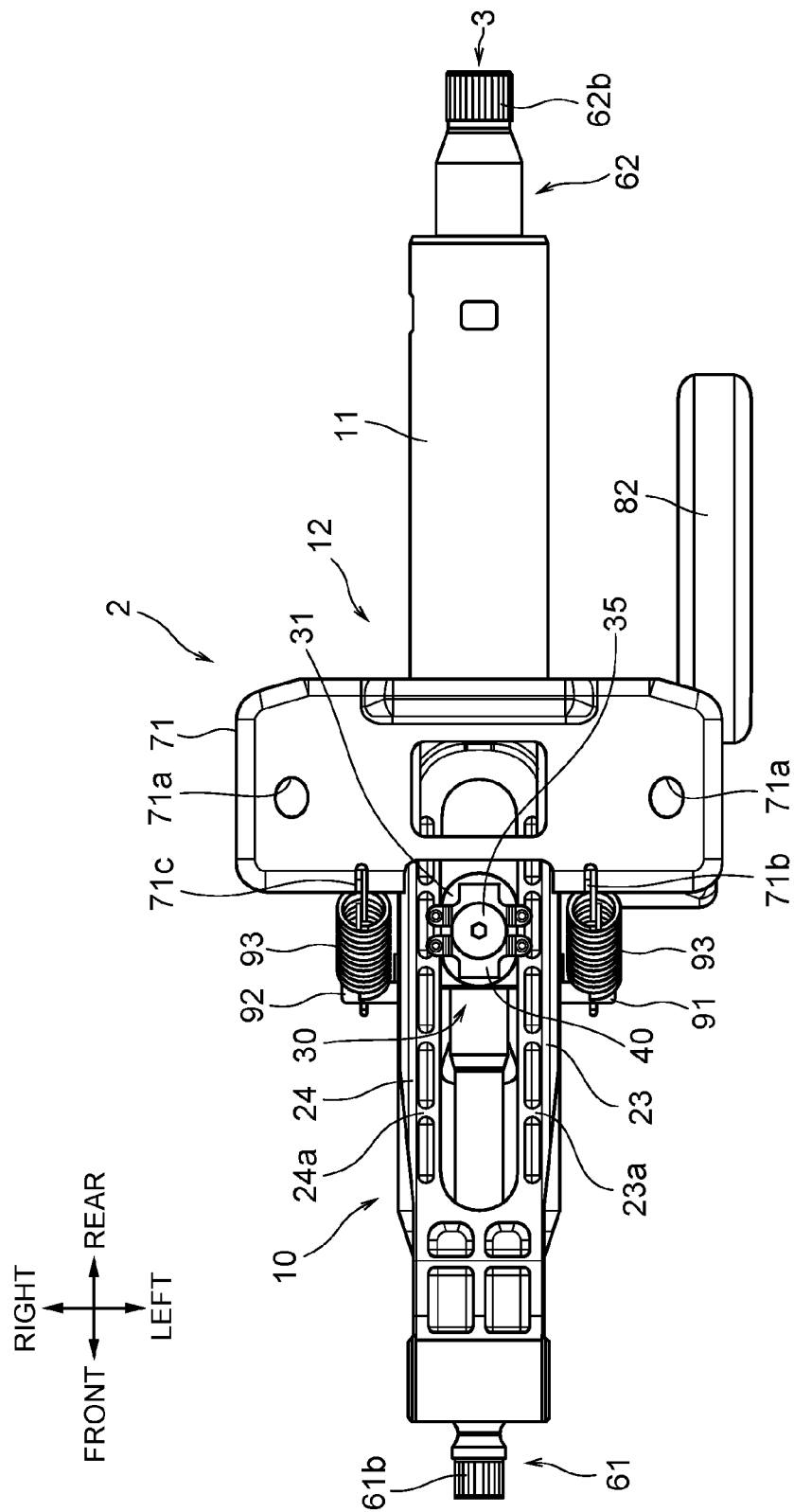
FIG. 19 is a plan view of the steering apparatus according to the third embodiment of the present application.
Figure 20:
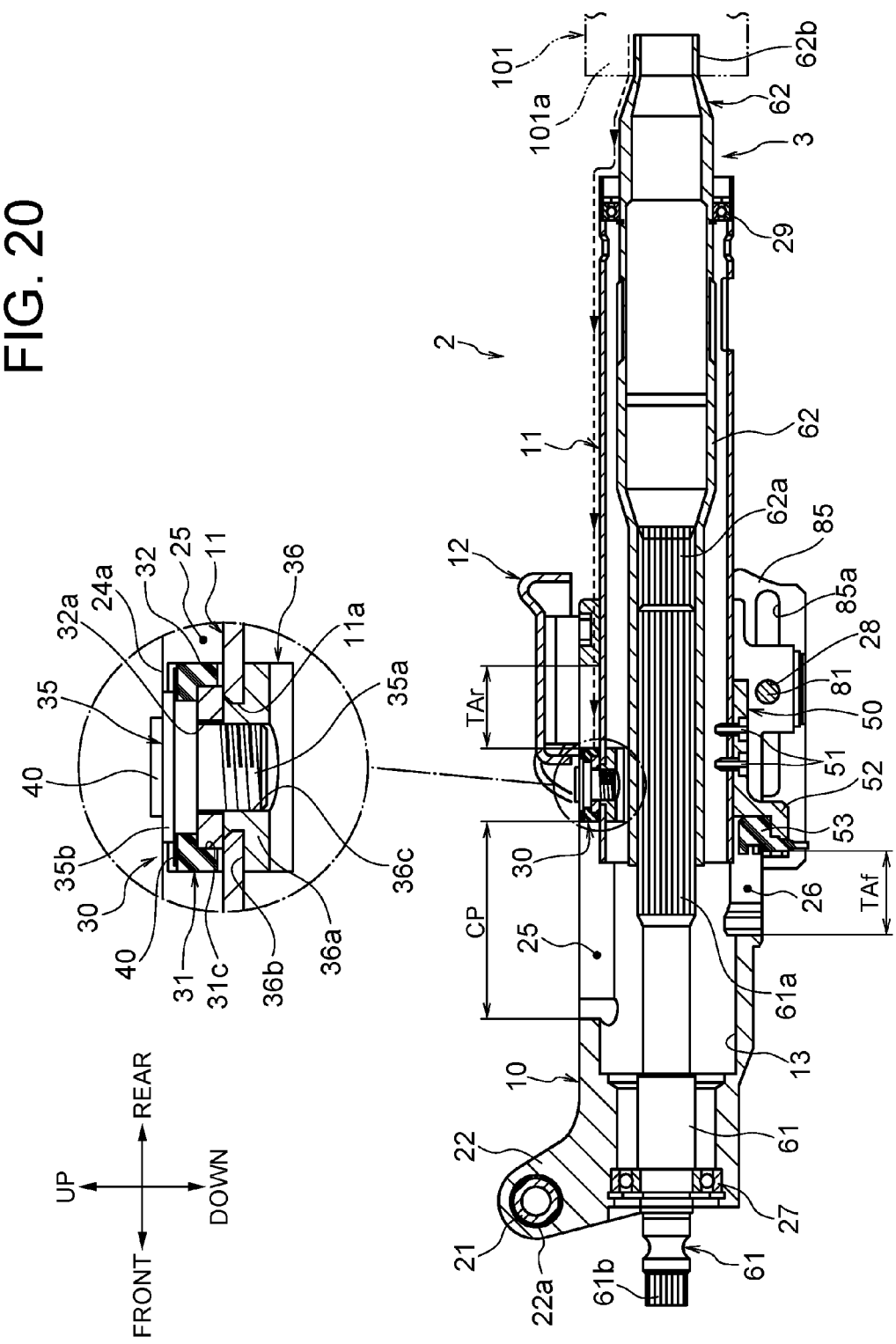
FIG. 20 is a vertical sectional view of the steering apparatus according to the third embodiment of the present application.
Figure 21:
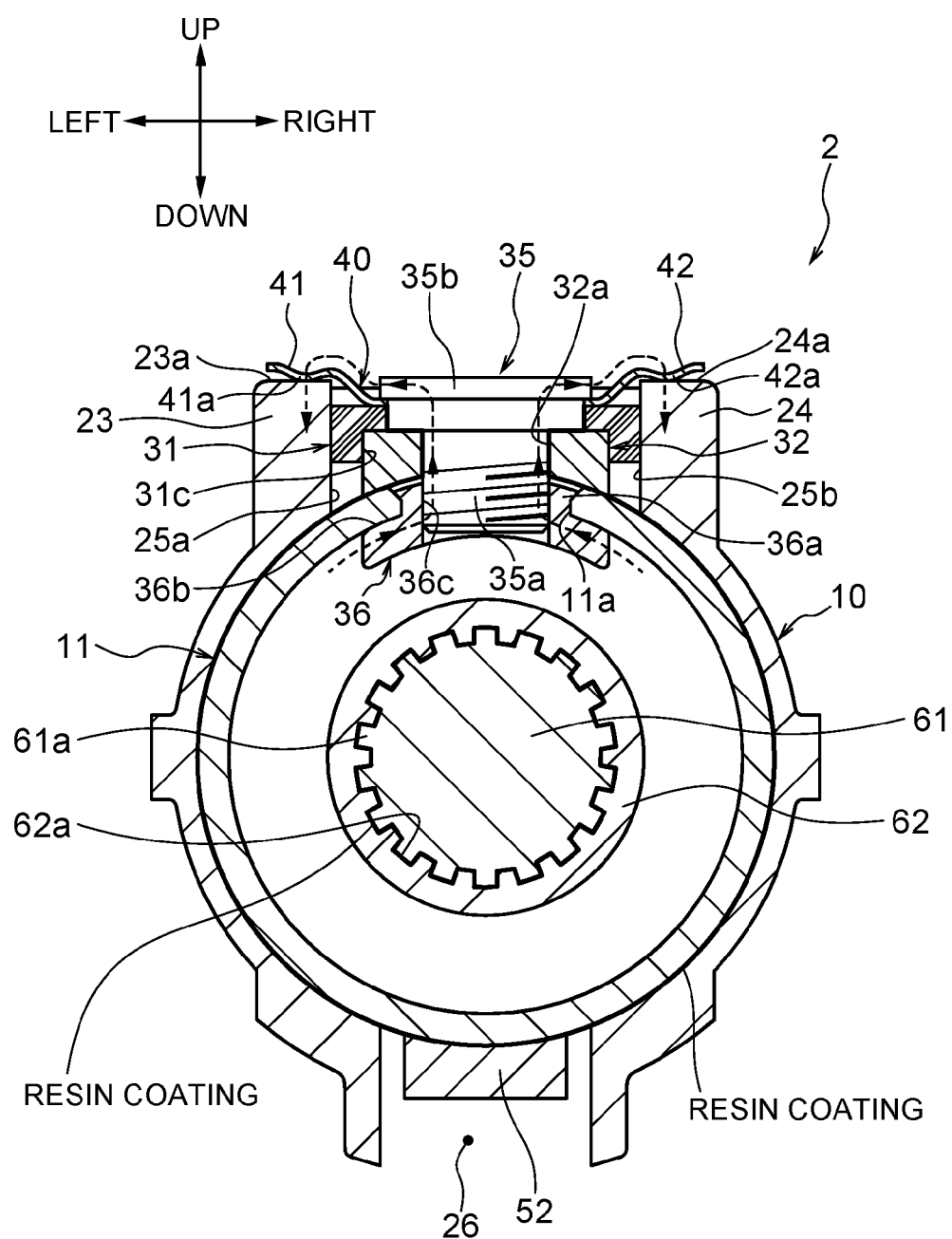
FIG. 21 is a sectional view illustrating a cross-section taken along the line XXI-XXI in FIG. 18.

FIG. 17 is a perspective view of a steering apparatus 2 according to the third embodiment as viewed from front in the oblique direction. FIG. 18 is a side view of the steering apparatus 2 according to the third embodiment. FIG. 19 is a plan view of the steering apparatus 2 according to the third embodiment. FIG. 20 is a vertical sectional view of the steering apparatus according to the third embodiment. FIG. 21 is a sectional view of the steering apparatus 2 according to the third embodiment, illustrating a cross-section taken along the line XXI-XXI in FIG. 18.

As illustrated in FIGS. 17 through 21, in the third embodiment also, the electrifying plate 40 is fixed to the portion, on the front side of the vehicle, of the inner column 11 by the stepped low head bolt 35.

Figure 22:
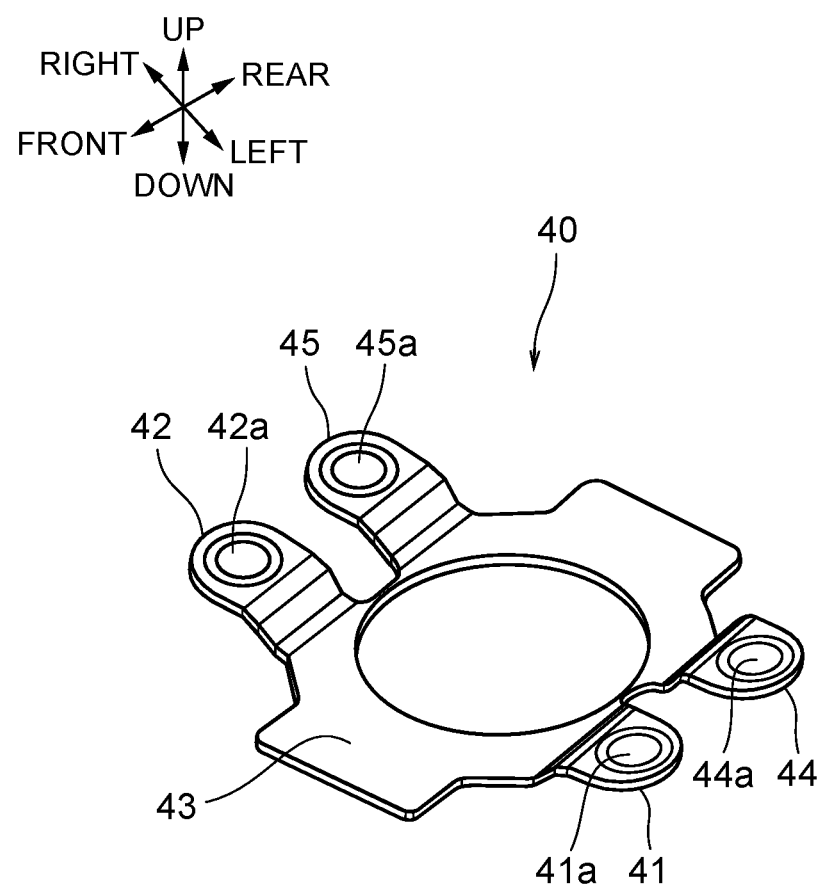
FIG. 22 is a perspective view of the electrifying plate according to the third embodiment of the present application.
Figure 23:
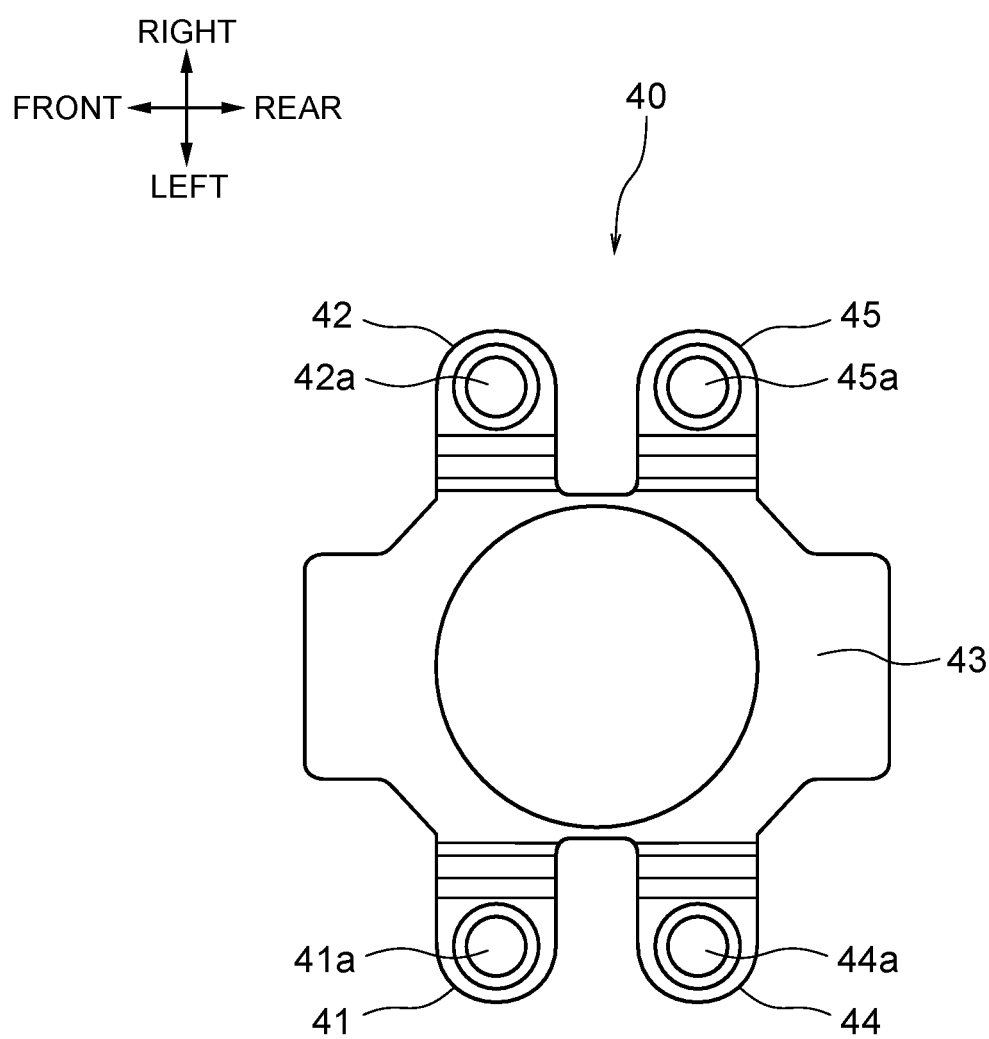
FIG. 23 is a plan view of the electrifying plate according to the third embodiment of the present application.

FIG. 22 is a perspective view of the electrifying plate 40 of the steering apparatus 2 according to the third embodiment. FIG. 23 is a plan view of the electrifying plate 40 of the steering apparatus 2 according to the third embodiment.

The electrifying plate 40 is configured to include the plate body 43 taking a rectangular shape being long in the front-and-rear direction and formed at the center with a bore through which the stepped low head bolt 35 passes, and the contact pieces 41, 42, 44, 45 extending left and right from the plate body 43.

The contact pieces 41, 44 extend leftward from the left side portion of the plate body 43, in which the contact piece 41 is disposed on the front side of the vehicle, while the contact piece 44 is disposed on the rear side of the vehicle. The contact pieces 41, 44 have contact protrusions 41a, 44a each protruding downward in a semi-spherical shape at a portion on the front end side.

The contact pieces 42, 45 extend rightward from the right side portion of the plate body 43, in which the contact piece 42 is disposed on the front side of the vehicle, while the contact piece 45 is disposed on the rear side of the vehicle. The contact pieces 42, 45 have contact protrusions 42a, 45a each protruding downward in a semi-spherical shape at a portion on the front end side.

The electrifying plate 40 is the punching press molded product of the spring steel plate having the elasticity, and may also involve using the material such as the phosphor bronze plate other than the spring steel plate, of which the electrifying plate 40 is composed.

Figure 24:
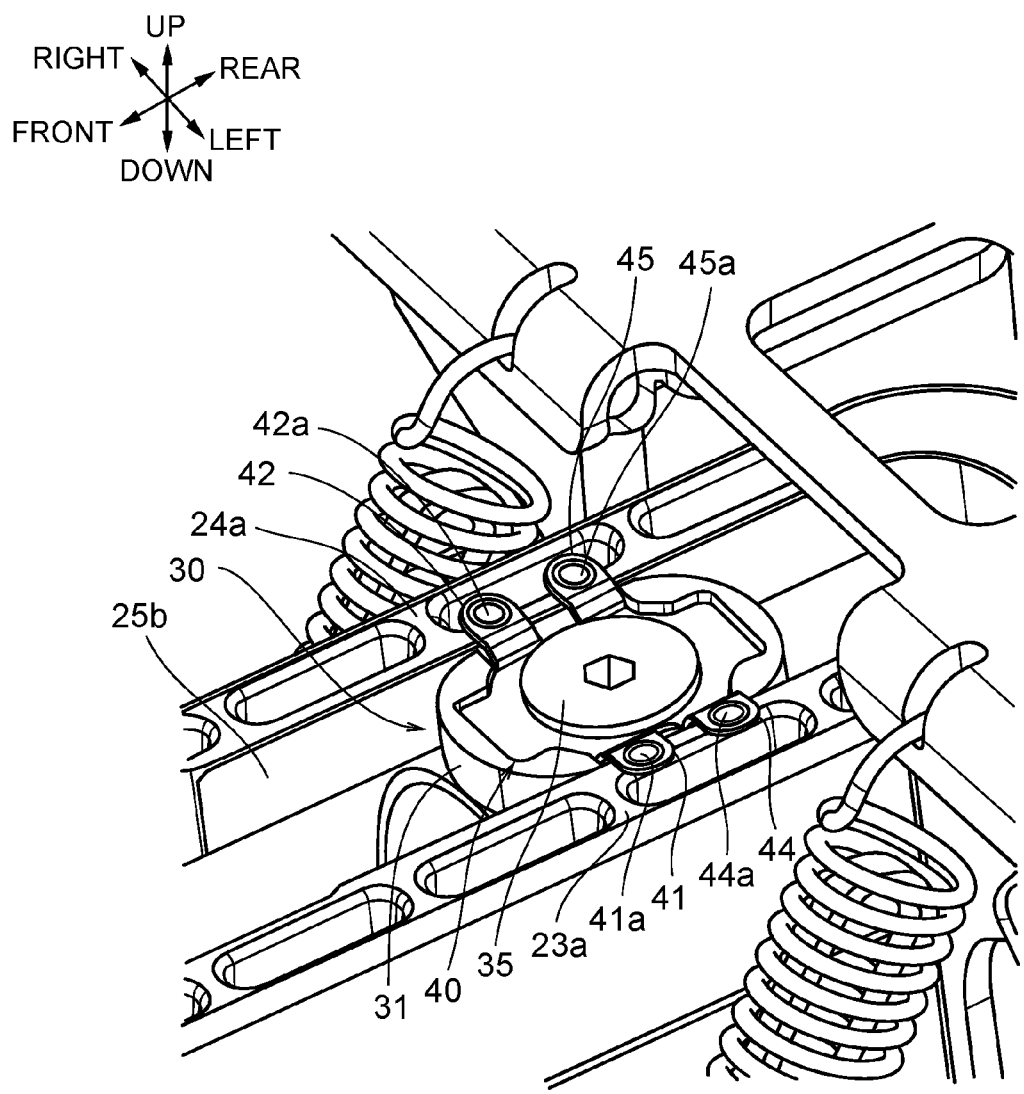
FIG. 24 is an enlarged perspective view illustrating a periphery of the electrifying plate of the steering apparatus according to the third embodiment of the present application.
Figure 25:
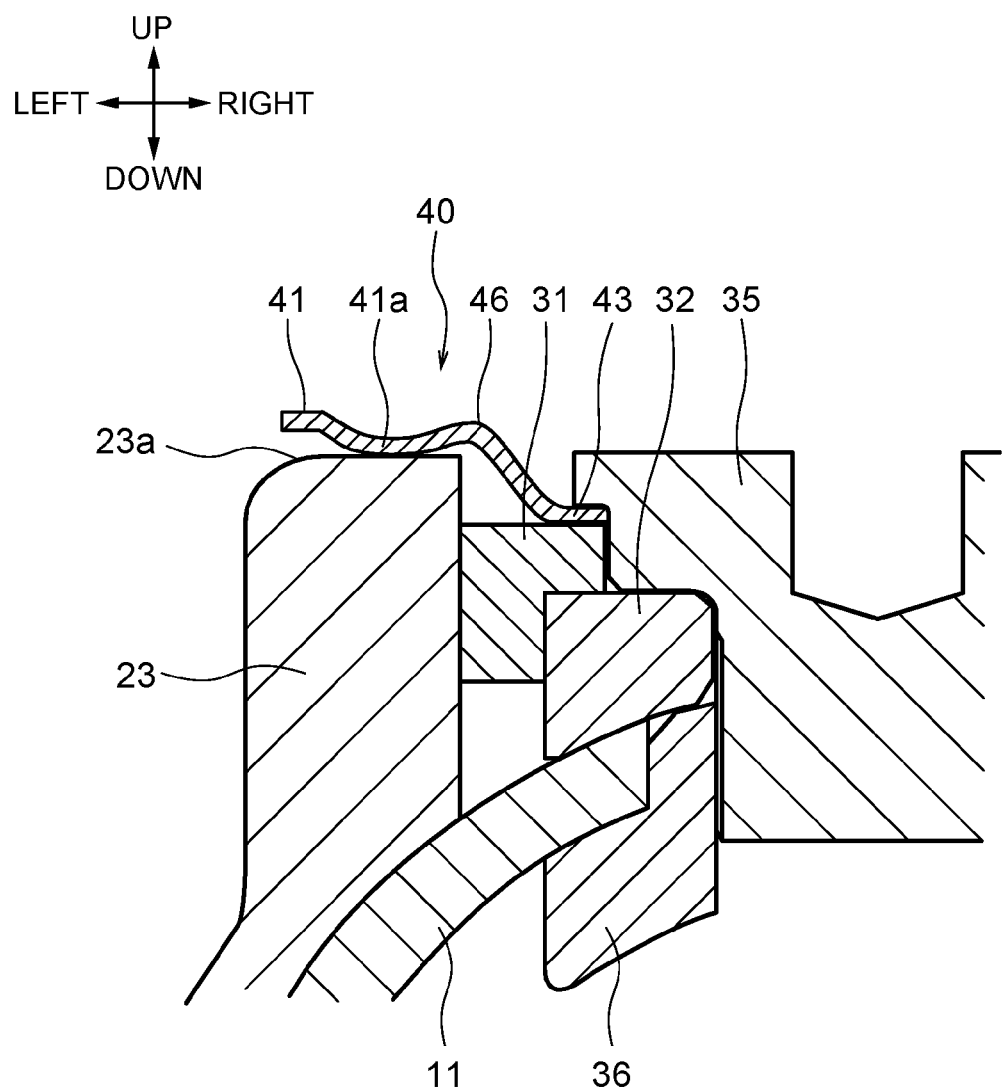
FIG. 25 is an enlarged sectional view illustrating a periphery of the electrifying plate of the steering apparatus according to the third embodiment of the present application.

FIG. 24 is an enlarged perspective view illustrating a periphery of the electrifying plate 40 attached to the steering apparatus 2. FIG. 25 is an enlarged sectional view illustrating the periphery of the electrifying plate 40.

The contact pieces 41, 42, 44, 45 of the electrifying plate 40 rise obliquely upward from the plate body 43 bilaterally on the left and right sides, and the contact protrusions 41a, 42a, 44a, 45a are in contact with the upper surfaces 23a, 24a of the guide walls 23, 24 at a predetermined contact pressure. Each of the portions, rising obliquely upward, of the contact pieces 41, 42, 44, 45 forms the flexural portion 46 flexed upward as illustrated in FIG. 25, and each of the contact protrusions 41a, 42a, 44a, 45a is configured to facilitate a vertical displacement owing to the elastic deformation of the flexural portion 46. This configuration enables the contact pieces 41, 42, 44, 45 to get in contact with the upper surfaces 23a, 24a while following slight corrugations of the upper surfaces 23a, 24a and a radial displacement of the inner column 11 upon being declamped from the outer column 10. Particularly in the third embodiment, a follow-up property of each of the contact pieces 41, 42, 44, 45 is enhanced by deepening a slit between the contact protrusions 41 and 44 and a slit between the contact protrusions 42 and 45. Note that it is preferable to smoothly finish the upper surfaces 23a, 24a of the left and right guide walls 23, 24 by grinding and other equivalent works to attain the stable contacts with the contact protrusions 41a, 42a, 44a, 45a.

Operation of Third Embodiment

According to the third embodiment discussed above, the contact pieces 41, 42, 44, 45 can be surely in contact with the outer column 10, and it is feasible to ensure the electrifying path leading to the car body 100 continuously from the inner column 11. Particularly, in the third embodiment, the electrifying plate 40 gets in contact with the outer column 10 at four points, and hence the reliability on the electrifying path is enhanced.

The descriptions of the specific embodiments and the partially modified examples have been finished so far, and the mode of the present invention is not, however, limited to these embodiments and modified examples.

For example, each of the embodiments discussed above is what the present invention is applied to the rack assist type electric power steering apparatus, and as a matter of course the present invention can be, however, applied to a column assist type electric power steering apparatus and other equivalent steering apparatuses.

The specific configurations and shapes of the steering column, the tilt/telescopic adjustment mechanism, the upper stopper and the electrifying plate can be properly varied within the range that does not deviate from the gist of the present invention. For example, it may be sufficient that the electrifying plate is in contact with the outer column regardless of a contact position, and therefore the electrifying plate may be configured to contact other portions of the guide wall and may also be configured to contact other portions of the outer column. A number of the contact pieces of the electrifying plate is not limited to the numerical values described above but may be one, three and five or more.

DESCRIPTION OF THE REFERENCE NUMERALS AND SYMBOLS 1 steering mechanism
2 steering apparatus
3 steering shaft
10 outer column
11 inner column
11a through-hole
12 tilt bracket
13 holding cylindrical hole
21 collar
22 pivot boss
22a boss hole
23, 24 guide wall
23a, 24a upper surface
25 guide groove
25a, 25b inner wall
26 slit
27 ball bearing
28 through-hole
29 ball bearing
30 upper stopper
31 guide member
31a left side edge
31b right side edge
32 stopper base 32a through-hole
35 stepped low head bolt
36 nut plate
36a boss
36b upper surface
36c screw hole
40 electrifying plate
41, 42, 44, 45 contact piece
41a, 42a, 44a, 45a contact protrusion
43 plate body
50 lower stopper
51 resin pin
52 buffer retaining portion
53 buffer block
54 engaging arm
61 front steering shaft (lower shaft)
61a male spline
61b serration
62 rear steering shaft (upper shaft)
62a female spline
62b serration
71 upper plate
72 left side plate
72a tilt adjustment elongate hole
73 right side plate
73a tilt adjustment elongate hole
80 tilt/telescopic adjustment mechanism
81 clamp bolt
81a male screw
82 operation lever
83 movable cam
84 fixed cam
85 friction plate
85a elongate hole
86 intermediate friction plate
86a left end plate
86b right end plate
86c connection plate
87 pressing plate
88 thrust bearing
89 nut
91, 92 hook portion
93 coil spring
95 coil spring
100 car body
101 steering wheel
102 intermediate shaft
103 steering gear
104 power-assisted mechanism
105 tie rod
106 pivot bolt

What is claimed is:

1. A steering apparatus comprising:
a steering shaft made of a material having a conductive property, the steering shaft including a fitting portion transferring a steering force and being contractible in an axial direction, the fitting portion being applied with a resin coating;
an outer column made of a material having the conductive property, the outer column being provided with a guide groove penetrating upwardly and extending in an axial direction, the outer column supporting the steering shaft rotatably;
an inner column made of a material having the conductive property, the inner column being fitted in the outer column to enable a relative movement in the axial direction, the inner column supporting the steering shaft rotatably;
a resin coating applied to an inner peripheral surface of said outer column or an outer peripheral surface of said inner column;
a guide member made of a resin and received in the guide groove, the guide member being in a slidable contact with the guide groove portion, the guide member being fitted to the inner column;
an electrifying member fitted to the inner column inwardly of the guide groove together with the guide member, the electrifying member having contact protrusions being in contact with upper surfaces of guide walls, which are formed on both sides of the guide groove of the outer column; and
a metallic fixture made of a material having a conductive property, the metallic fixture being in contact with the inner column, the metallic fixture fitting the electrifying member together with the guide member to the inner column.

2. The steering apparatus according to claim 1, wherein the electrifying member is made of a metal plate material and is in contact with the outer column at a predetermined contact pressure while getting elastically deformed.

3. The steering apparatus according to claim 1, wherein the electrifying member has a couple of contact pieces extending on both of left and right sides.

4. The steering apparatus according to claim 1, wherein the electrifying member has a plurality of contact pieces being in contact with the upper surfaces of the guide walls, the plurality of contact pieces being arranged in front-and-rear direction of a vehicle.

5. The steering apparatus according to claim 4, wherein the contact pieces are disposed on both of left and right sides of the electrifying member.

6. The steering apparatus according to claim 1, wherein the contact protrusion protrudes in a semi-spherical shape.

7. The steering apparatus according to claim 1, wherein the contact protrusion is elongate in the front-and-rear direction.

8. The steering apparatus according to claim 3, wherein a flexural portion is formed at a portion, on a proximal side, of the contact piece.

9. The steering apparatus according to claim 8, wherein a hole is formed at a center of the flexural portion.

10. The steering apparatus according to claim 1, wherein a surface, being in contact with the electrifying member, of the outer column is smoothly finished by grinding.

11. The steering apparatus according to claim 2, wherein the electrifying member has a couple of contact pieces extending on both of left and right sides.

12. The steering apparatus according to claim 2, wherein the electrifying member has a plurality of contact pieces being in contact with the upper surfaces of the guide wall, the plurality of contact pieces being arranged in front-and-rear direction of a vehicle.

13. The steering apparatus according to claim 12, wherein the contact pieces are disposed on both of left and right sides of the electrifying member.

14. The steering apparatus according to claim 11, wherein a flexural portion is formed at a portion, on a proximal side, of the contact piece.

15. The steering apparatus according to claim 14, wherein a hole is formed at a center of the flexural portion.

* * * * *